(12) United States Patent
Usui et al.

(10) Patent No.: US 8,829,133 B2
(45) Date of Patent: Sep. 9, 2014

(54) ABA TRIBLOCK COPOLYMER, THICKENER, AND AQUEOUS COMPOSITION

(71) Applicants: Yuuma Usui, Kanagawa (JP); Shin-ichi Yusa, Hyogo (JP)

(72) Inventors: Yuuma Usui, Kanagawa (JP); Shin-ichi Yusa, Hyogo (JP)

(73) Assignees: Ricoh Company, Ltd., Tokyo (JP); University of Hyogo, Hyogo (JP)

( * ) Notice: Subject to any disclaimer, the term of this patent is extended or adjusted under 35 U.S.C. 154(b) by 0 days.

(21) Appl. No.: 13/867,388

(22) Filed: Apr. 22, 2013

(65) Prior Publication Data
US 2013/0284966 A1    Oct. 31, 2013

(30) Foreign Application Priority Data

Apr. 26, 2012   (JP) .................................. 2012-100942
Feb. 12, 2013   (JP) .................................. 2013-024416

(51) Int. Cl.

| | | |
|---|---|---|
| C08F 222/16 | (2006.01) | |
| C08F 222/22 | (2006.01) | |
| C08F 222/38 | (2006.01) | |
| C08F 2/38 | (2006.01) | |
| C08K 3/16 | (2006.01) | |
| C08F 293/00 | (2006.01) | |
| C08F 4/04 | (2006.01) | |

(52) U.S. Cl.
CPC .................. C08F 293/00 (2013.01); C08F 2/38 (2013.01); C08F 4/04 (2013.01); C08K 3/16 (2013.01); C08F 2438/03 (2013.01); C08F 293/005 (2013.01); C08K 2201/001 (2013.01)
USPC ..... 526/307; 526/303.1; 526/304; 526/307.1; 526/307.2; 526/307.3; 526/307.5; 526/307.7; 526/312; 526/318; 526/318.3

(58) Field of Classification Search
USPC ........ 526/318, 318.3, 303.1, 304, 307, 307.1, 526/307.2, 307.5, 307.7, 312
See application file for complete search history.

(56) References Cited

U.S. PATENT DOCUMENTS 7,951,888 B2 *   5/2011   Boupat et al. .................. 526/319
2010/0280182 A1 * 11/2010   Balk et al. ...................... 525/217

(Continued)

FOREIGN PATENT DOCUMENTS

JP    3584722    8/2004
JP    2007-210903    8/2007

(Continued)

OTHER PUBLICATIONS

Yang, Qingobo et al, "Synthesis and Aqueous Solution Properties of Hydrophobically Modified Anionic Acrylamide Copolymers", 2008, Journal of Polymer Science:Part B:Polmer Physics, col. 46, 2465-2474.*

(Continued)

*Primary Examiner* — Ling Choi
*Assistant Examiner* — David L Miller
(74) *Attorney, Agent, or Firm* — Cooper & Dunham LLP

(57) ABSTRACT

To provide an ABA triblock copolymer containing: an A-block having, in a constitutional unit thereof, a monomer represented by the following general formula (1) or a monomer represented by the following general formula (2); and a B-block having, in a constitutional unit thereof, a hydrophilic monomer having a radical polymerizable unsaturated bond,

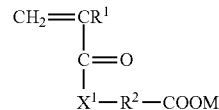

General Formula (1)

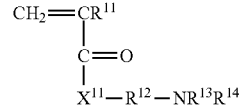

General Formula (2)

where $R^1$ is a hydrogen atom or a methyl group; $R^2$ is a C5-C18 alkylene group; M is a hydrogen atom or a monovalent metal atom; and $X^1$ is —NH— or an oxygen atom in the general formula (1), and where $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom in the general formula (2).

13 Claims, 27 Drawing Sheets

(56) References Cited

U.S. PATENT DOCUMENTS

| | | |
|---|---|---|
| 2011/0273523 A1 | 11/2011 | Tsukamoto et al. |
| 2012/0050393 A1 | 3/2012 | Usui et al. |
| 2013/0050363 A1 | 2/2013 | Usui et al. |
| 2013/0057628 A1 | 3/2013 | Suzuki et al. |

FOREIGN PATENT DOCUMENTS

| | | |
|---|---|---|
| JP | 2009-544830 | 12/2009 |
| JP | 2010-99593 | 5/2010 |
| JP | 2010-173201 | 8/2010 |
| JP | 2010-188665 | 9/2010 |
| JP | 2010-208147 | 9/2010 |
| JP | 2010-247381 | 11/2010 |
| JP | 2010-253807 | 11/2010 |
| JP | 2011-084041 | 4/2011 |
| JP | 2011-167885 | 9/2011 |
| JP | 2011-235589 | 11/2011 |
| JP | 2012-052027 | 3/2012 |
| JP | 2012-111887 | 6/2012 |
| JP | 2013-060574 | 4/2013 |

OTHER PUBLICATIONS

Biomacromolecules, vol. 4, No. 4, 2003 864-868.

European search report dated Jul. 22, 2013 in corresponding European patent application No. 13 165 227.3.

Masamichi Inoue et al: "Hollow Nanoparticles Prepared from pH-Responsive Template Polymer Micelles", Journal of Polymer Science Part A: Polymer Chemistry, vol. 50, No. 13, Apr. 5, 2012, pp. 2596-2603.

Tatjana Friedrich et al: "Intelligent Hydrogels Via Gamma-Ray Induced Polymerization of Micellar Monomer Solutions and Microemulsions", Macromolecular Symposia, vol. 287, No. 1, Feb. 12, 2010, pp. 16-21.

* cited by examiner

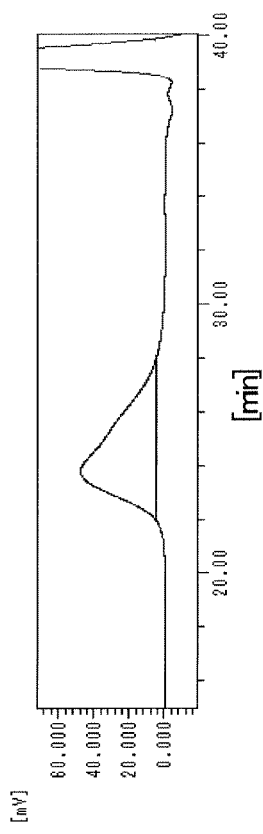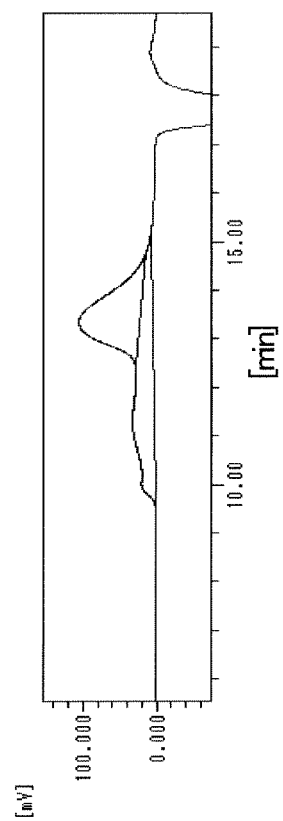

ABA TRIBLOCK COPOLYMER, THICKENER, AND AQUEOUS COMPOSITION

BACKGROUND OF THE INVENTION

1. Field of the Invention

The present invention relates to an ABA triblock copolymer, a thickener, and an aqueous composition.

2. Description of the Related Art

It has been expected that a reversible gelling material, which induces a sol-gel change of a system, such as a composition containing a medium (e.g. water) due to reversible viscosity increase or degrease, is applied, as one type of viscosity controlling agents, such as a thickener, for drug carriers for a drug delivery system or the like, regenerative medicine materials for tissue engineering or the like, actuators or pumps for artificial muscle, cosmetic materials, display elements, recording elements, energy elements of solar batteries or the like, additives for inks, coating agents for paper for certain use, and various functional films.

As for a factor for giving the reversible viscosity change to the system, for example, included are temperature, pH (strictly speaking, $H^+$), light, electric field, ion, and addition of a solvent. Among them, pH has been attracted attention as the factor for giving reversibility, because a reversible change can be promptly given without using a complicated device, and there are portions where pH thereof are different within organisms.

In the case where the factor for giving reversibility is pH, a system containing a medium induces a viscosity change, such as a sol-gel change, due to a difference between an associated state, and a non-associated state at around an acid dissociation constant (pKa).

Polyacrylic acid, which is a pH-responsive polymer induces a reversible viscosity change to a system due to a difference in pH, is a polymer having carboxylic acid pKa of which is 5 to 6. The polyacrylic acid receives protons at low pH, but dissociates protons at high pH, so that it tends to be easily dissolved due to electrostatic repulsion. For example, in the case where a system containing crosslinked polyacrylic acid, which is chemically crosslinked, is acidic, a carboxyl group of the polyacrylic acid is in the non-dissociated state, and therefore it is contracted. Accordingly, such system has low viscosity. In the case where a system containing the crosslinked polyacrylic acid is alkaline, on the other hand, the crosslinked polyacrylic acid is swollen due to electrostatic repulsion of dissociated carboxyl ions to thereby form a microgel. Accordingly, such system has high viscosity. Meanwhile, chitosan, crosslinked poly-N-dimethylaminoethyl methacrylate (PDMAEMA), and crosslinked poly-N-diethylaminoethyl methacrylate (PDEAEMA) each contain an amino group in a molecule thereof. In the case where a system containing any of these polymers is acidic, the system has high viscosity due to electrostatic repulsion of ammonium ions.

The pH-responsive polymer exhibiting a thickening effect due to cubical expansion caused by electrostatic repulsion, such as the crosslinked polyacrylic acid, and the crosslinked poly-N-diethylaminoethyl methacrylate, are however influenced by ions present in a system. In the case where a system contains many ions, such as an energy element contains an electrolyte or a dye ink, there is a problem that a thickening effect is hardly attained. In the case of the pH-responsive polymer utilizing cubical expansion, moreover, there are problems that it takes time to cause a volumetric change, and a response time of a thickening effect is slow.

As a pH-responsive polymer that solves the aforementioned problems, there is a polymer, which induces a viscosity change to a system utilizing hydrophobic association. As a polymer that induces a viscosity change to a system utilizing hydrophobic association, for example, proposed is an ABA triblock copolymer having 2-diisopropylaminoethyl methacrylate (DPA) or 2-diethylaminoethyl methacrylate (DEA) as an A-block, and 2-methacryloyloxyethylphosphorylcholine (MPC) as a B-block (see, for example, Biomacromolecules, Vol. 4, No. 4, 2003 864-868). The ABA triblock copolymer of the disclosed technology is a polymer that exhibits a thickening effect even when an electrolyte is added to a system.

In order for the ABA triblock copolymer of the disclosed technology to exhibit a sufficient thickening effect, for example, to gelatinize a system, it is necessary to contain 40 mol % or more of a pH responsive monomer (DPA, DEA) per molecule of the polymer, and moreover, about 10% by mass of the polymer is required in water. Therefore, there are problems that a significant amount of alkali is required to deprotonate ammonium ions, and a response speed required for sufficient gelation becomes slow.

Moreover, the polymer induces a viscosity change to a system using hydrophobic association typically requires a high polymer concentration in the system to exhibit a sufficient thickening effect, and there fore there is a problem that a material cost is high, and the viscosity of the system is high even before exhibiting a reversible thickening effect.

Note that, the above disclosed technology is an example of a material that induces a viscosity change to a system utilizing hydrophobic association under an alkaline condition. As for a material for hydrophobing under an acidic condition and an application example thereof, disclosed are a diblock copolymer (MAU/AMPS=95/5 (molar ratio)) of a monomer that becomes hydrophobic (e.g., 11-methacryl amide undecanoic acid (MAU)) under an acidic condition, and a hydrophilic monomer regardless of pH (e.g., 2-acryl amide-2-methylpropane sulfonic acid (AMPS)), and a cosmetic composition containing such polymer as a powder surface treating agent (see, for example, Japanese Patent Application Laid-Open (JP-A) No. 2007-210903). The disclosed technology has a function as a dispersing agent for improving dispersibility of a powder material, such as titanium oxide, a function for giving water repellency as it is applied on skin, and washability with alkali, such as soap. The polymer used in this technique is a polymer material utilizing a reversible change between hydrophilic and hydrophobic natures, but has hardly any function for inducing a reversible viscosity change.

Accordingly, it is currently desired to provide a pH responsive polymer, which can be used in a system where an electrolyte is present, has a short response time to a viscosity change, can exhibits a reversible thickening effect with a low concentration thereof.

SUMMARY OF THE INVENTION

The present invention aims to solve the various problems in the art and achieve the following object. An object of the present invention is to provide an ABA triblock copolymer, which can be used in a system where an electrolyte is present, and has a quick response time to a viscosity change, and can exhibits a reversible thickening effect even with a low concentration.

The means for solving the aforementioned problems are as follows:

The ABA triblock copolymer of the present invention contains:

an A-block having, in a constitutional unit thereof, a monomer represented by the following general formula (1) or a monomer represented by the following general formula (2); and a B-block having, in a constitutional unit thereof, a hydrophilic monomer having a radical polymerizable unsaturated bond,

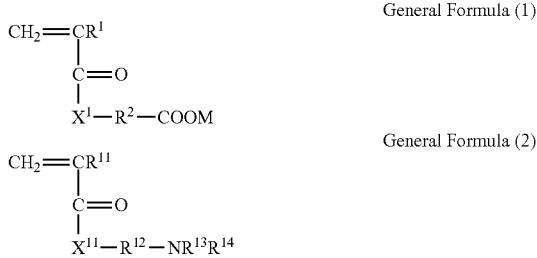

General Formula (1)

General Formula (2)

where $R^1$ is a hydrogen atom or a methyl group; $R^2$ is a C5-C18 alkylene group; M is a hydrogen atom or a monovalent metal atom; and $X^1$ is —NH— or an oxygen atom in the general formula (1), and where $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom in the general formula (2).

The present invention can solve the various problems in the art, and can provide an ABA triblock copolymer, which can be used in a system where an electrolyte is present, and has a quick response time to a viscosity change, and can exhibits a reversible thickening effect even with a low concentration.

BRIEF DESCRIPTION OF THE DRAWINGS

FIG. 14 is the GPC chart of the ABA triblock copolymer obtained in Example 5.

FIG. 15 is the GPC chart of the ABA triblock copolymer obtained in Example 6.

Figure 1:
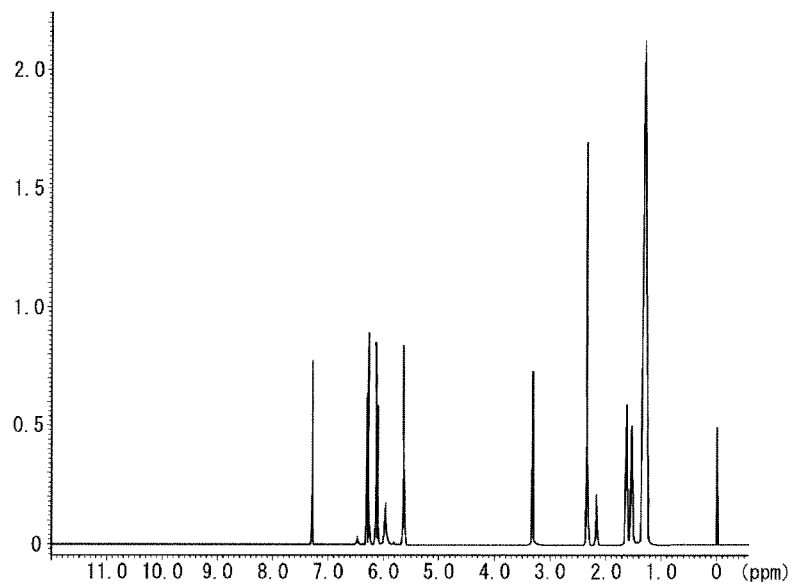
FIG. 1 is the $^1$H-NMR spectrum of 11-acrylamide undecanoic acid obtained in Synthesis Example 1.

DETAILED DESCRIPTION OF THE INVENTION (ABA Triblock Copolymer)

The ABA triblock copolymer of the present invention contains: an A-block having, in a constitutional unit thereof, a monomer represented by the following general formula (1) or a monomer represented by the following general formula (2); and a B-block having, in a constitutional unit thereof, a hydrophilic monomer having a radical polymerizable unsaturated bond.

<A-Block>

The A-block contains a monomer represented by the following general formula (1) or a monomer represented by the following general formula (2) in a constitutional unit thereof.

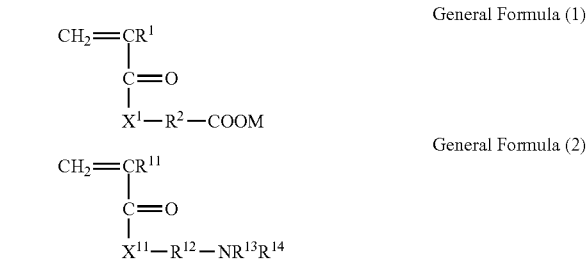

General Formula (1)

General Formula (2)

In the general formula (1), $R^1$ is a hydrogen atom or a methyl group; $R^2$ is a C5-C18 alkylene group; M is a hydrogen atom or a monovalent metal atom; and $X^1$ is —NH— or an oxygen atom. In the general formula (2), $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom.

The monovalent metal atom of M is appropriately selected depending on the intended purpose without any limitation, and examples thereof include sodium, and potassium.

The C5-C18 alkylene group of $R^2$ is appropriately selected depending on the intended purpose without any limitation, but it is preferably C6-C18 alkylene group, more preferably C9-C11 alkylene group, and even more preferably C10 alkylene group. Moreover, the C5-C18 alkylene group is preferably a straight chain.

The C5-C18 alkylene group of $R^{12}$ is appropriately selected depending on the intended purpose without any limitation, but it is is preferably C6-C18 alkylene group, more preferably C9-C13 alkylene group, and even more preferably C11 alkylene group. Moreover, the C5-C18 alkylene group is preferably a straight chain.

A combination of $R^1$, $X^1$, $R^2$, and M in the general formula (1) is appropriately selected depending on the intended purpose without any limitation, but in view of achieving an excellent thickening effect, preferred are a combination that $R^1$ is a hydrogen atom, $X^1$ is an oxygen atom, $R^2$ is a C9-C11 alkylene group, and M is a hydrogen atom or sodium; a combination that $R^1$ is a hydrogen atom, $X^1$ is —NH—, $R^2$ is C9-C11 alkylene group, and M is a hydrogen atom or sodium; a combination that $R^1$ is a methyl group, $X^1$ is an oxygen atom, $R^2$ is C9-C11 alkylene group, and M is a hydrogen atom or sodium; and a combination that $R^1$ is a methyl group, $X^1$ is —NH—, $R^2$ is C9-C11 alkylene group, and M is a hydrogen atom or sodium.

Examples of the monomer represented by the general formula (1) include 6-acrylamidehexanoic acid, 11-acrylamide undecanoic acid, 8-acryl amide octanoic acid, and 12-acryl amidedodecanoic acid.

The monomer represented by the general formula (1) may be used alone, or in combination.

The monomer represented by the general formula (1) forms a repeating unit represented by the general formula (1') in the ABA triblock copolymer.

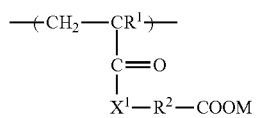

General Formula (1')

In the general formula (1'), $R^1$ is a hydrogen atom or a methyl group; $R^2$ is C5-C18 alkylene group (preferably C6-C18 alkylene group), M is a hydrogen atom or a monovalent metal atom; and $X^1$ is —NH— or an oxygen atom.

A combination of $R^{11}$, $X^{11}$, $R^{12}$, $R^{13}$, and $R^{14}$ in the general formula (2) is appropriately selected depending on the intended purpose without any limitation, but in view of achieving an excellent thickening effect, preferred are a combination that $R^{11}$ is a hydrogen atom, $X^{11}$ is an oxygen atom, $R^{12}$ is C9-C13 alkylene group, and $R^{13}$ and $R^{14}$ are both ethyl groups; and a combination that $R^{11}$ is a hydrogen atom, $X^{11}$ is —NH—, $R^{12}$ is C9-C13 alkylene group, and $R^{13}$ and $R^{14}$ are both ethyl groups.

Examples of the monomer represented by the general formula (2) include acryl amidedecyl-N,N-diethylamine, acryl amideundecyl-N,N-diethylamine, and acryl amidedodecyl-N,N-diethylamine.

The monomer represented by the general formula (2) may be used alone, or in combination.

The monomer represented by the general formula (2) forms a repeating unit represented by the general formula (2') in the ABA triblock copolymer.

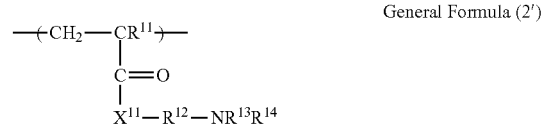

General Formula (2')

In the general formula (2'), $R^{11}$ is a hydrogen atom or a methyl group; $R^{12}$ is C5-C18 alkylene group (preferably C6-C18 alkylene group); $R^{13}$ and $R^{14}$ are each independently a hydrogen atom, a methyl group, or an ethyl group; and $X^{11}$ is —NH— or an oxygen atom.

In the case where the A-block has the monomer represented by the general formula (1) in the constitutional unit thereof in the ABA triblock copolymer, a thickening effect is exhibited by making a system containing the ABA triblock copolymer acidic. It is considered that an exhibition of the thickening effect is due to hydrophobic association of the A-block. For example, when an acid component, such as hydrochloric acid, is added to an aqueous solution containing the ABA triblock copolymer, a carboxyl group in the monomer represented by the general formula (1) is protonated to cause hydrophobic association of the A-block. As a result, the thickening effect is exhibited.

In the case where the A-block has the monomer represented by the general formula (2) in the constitutional unit thereof in the ABA triblock copolymer, a thickening effect is exhibited by making a system containing the ABA triblock copolymer alkaline. It is considered that an exhibition of the thickening effect is due to hydrophobic association of the A-block. For example, when an alkali component, such as sodium hydroxide, is added to an aqueous solution containing the ABA triblock copolymer, an amino group in the monomer represented by the general formula (2) is deprotonated to cause hydrophobic association of the A-block. As a result, a thickening effect is exhibited.

The A-block may further contain other monomers in a constitutional unit thereof, other than a monomer represented by the general formula (1) or (2), as long as they do not adversely affect an effect obtainable by the present invention. The aforementioned other monomers are appropriately selected depending on the intended purpose without any limitation, provided that they are radical polymerizable monomer.

An amount of the aforementioned other monomers in the constitutional unit of the A-block is appropriately selected depending on the intended purpose without any limitation, but it is preferably 5 mol % or lower, more preferably 1 mol % or lower.

In the case where the ABA triblock copolymer is an ABA triblock copolymer that exhibits a thickening effect under an acidic condition, the A-block preferably contains, in the constitutional unit thereof, the monomer represented by the general formula (1) in an amount of 95 mol % or greater, more preferably 99 mol % or greater, and even more preferably 100 mol %.

In the case where the ABA triblock copolymer is an ABA triblock copolymer that exhibits a thickening effect under an alkaline condition, the A-block preferably contains, in the constitutional unit thereof, the monomer represented by the general formula (2) in an amount of 95 mol % or greater, more preferably 99 mol % or greater, and even more preferably 100 mol %.

In the ABA triblock copolymer, one A-block and the other A-block may have the same polymerization degree, or different polymerization degrees. A difference between the polymerization degree of one A-block and the polymerization degree of the other A-block is appropriately selected depending on the intended purpose without any limitation, but it is preferably 10 or less, more preferably 5 or less, and even more preferably 3 or less in view of a thickening effect.

In the ABA triblock copolymer, a constitutional unit of one A-block and a constitutional unit of the other A-block may have the same molecular structure, or different molecular structures.

<B-Block>

The B-block has a hydrophilic monomer having a radical polymerizable unsaturated bond in a constitutional unit thereof.

The hydrophilic monomer is appropriately selected depending on the intended purpose without any limitation. Here, the hydrophilicity of the hydrophilic monomer means, for example, that 100 g or greater of a monomer is soluble to 1 L of water at 25° C. Whether the monomer is dissolved or not can be determined by transparency of water, which can be visually confirmed.

The hydrophilic monomer is appropriately selected depending on the intended purpose without any limitation, but it is preferably a monomer represented by the following general formula (3) in view of its excellent thickening effect.

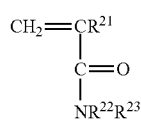

General Formula (3)

In the general formula (3), $R^{21}$ is a hydrogen atom or a methyl group; and $R^{22}$ and $R^{23}$ are each independently a hydrogen atom, a methyl group, or an ethyl group.

The monomer represented by the general formula (3) forms a repeating unit represented by the general formula (3') in the ABA triblock copolymer.

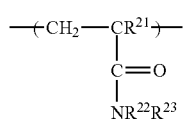

General Formula (3')

In the general formula (3'), $R^{21}$ is a hydrogen atom or a methyl group; and $R^{22}$ and $R^{23}$ are each independently a hydrogen atom, a methyl group, or an ethyl group.

Examples of the hydrophilic monomer include acryl amide (AA), methacryl amide (MA), N-methylacryl amide (MAA), N-methylmethacryl amide (MMA), N,N-dimethylacryl amide (DMAA), N,N-dimethylmethacryl amide (DMMA), N,N-diethylacryl amide (DEAA), N,N-diethylmethacryl amide (DEMA), 2-acryl amide-2-methylpropane sulfonic acid (AMPS) sodium salt, sodium p-styrene sulfonate (PSSNa), N-isopropylacryl amide (NIPAM), N-vinyl pyrrolidone (NVP), and vinyl alcohol (VA). These may be used alone, or in combination.

The B-block may further contain, in a constitutional thereof, other monomers other than the hydrophilic monomer, as long as they do not adversely affect an effect obtainable by the present invention. The aforementioned other monomers are appropriately selected depending on the intended purpose without any limitation, provided that they are radical polymerizable monomers.

An amount of the aforementioned other monomers in the constitutional unit of the B-block is appropriately selected depending on the intended purpose without any limitation, but it is preferably 5 mol % or less, more preferably 1 mol % or less.

The B-block preferably contains, in the constitutional unit thereof, the hydrophilic monomer in an amount of 90 mol % or greater, more preferably 95 mol % or greater, even more preferably 99 mol % or greater, and particularly preferably 100 mol %. Note that, in the constitutional unit, a residue of an initiator for polymerization and a residue of a chain transfer agent are not included.

<Average Polymerization Degree>

The average polymerization degree of the A-block [P(A)] and the average polymerization degree of the B-block [P(B)] are appropriately selected depending on the intended purpose without any limitation, but they preferably satisfy the following formulae (I) and (II) in view of achieving an excellent thickening effect.

$3<P(A)<10$   Formula (I)

$20<P(B)/P(A)<300$   Formula (II)

Note that, the average polymerization degree [P(A)] is an average value of the polymerization degrees of A-blocks at the both terminals of the ABA triblock copolymer.

When the P(A) is 3 or less, the hydrophobic association force of the A-block is weak, which may lower a thickening effect. When the P(A) is 10 or greater, $H^+$ or $OH^-$ required for an exhibition of a thickening effect is required in a large amount, which may lower a response to viscosity change.

When the P(B)/P(A) is 20 or less, $H^+$ or $OH^-$ required for an exhibition of a thickening effect is required in a large amount, which may lower a response to viscosity change, and moreover, the hydrophobic association force per molecule of a polymer is strong so that aggregation of polymers are caused, which may lower a thickening effect. When the P(B)/P(A) is 300 or greater, water solubility of a resulting polymer is high, and therefore a thickening effect due to hydrophobic association may be difficult to be exhibited, even through the A-block is hydrophobized.

The average polymerization degree can be measured, for example, by $^1$H-NMR.

The polymerization degree of each A-block [P(A')] in the ABA triblock copolymer and the average polymerization degree [P(B)] preferably satisfy the following formulae (XI) and (XII) in view of achieving more excellent thickening effect.

$3<P(A')<10$   Formula (XI)

$20<P(B)/P(A')<300$   Formula (XII)

The polymerization degree of each A-block [P(A')] can be measured, for example, by $^1$H-NMR.

It is more preferred that the average polymerization degree [P(A)] and the average polymerization degree [P(B)] satisfy the following formulae (I') and (II')

$4<P(A)<6$   Formula (I')

$100<P(B)/P(A)<200$   Formula (II')

By satisfying the formulae (I') and (II'), a significantly excellent thickening effect is achieved. As a result, the thickening effect, with which a system containing the ABA triblock copolymer causes gelation, can be obtained.

Here, "gelation" means the state where a system loses its flowability, and for example, a state where the shear viscosity is 10,000 mPa·s or greater with shear rate of 1/s.

<Molecular Weight Distribution>

The molecular weight distribution (Mw/Mn) of the ABA triblock copolymer is appropriately selected depending on the intended purpose without any limitation, but it is preferably 2.00 or less, more preferably 1.50 or less, in view of achieving an excellent thickening effect. Note that, the lower limit thereof is 1.00.

The molecular weight distribution can be measured by gel permeation chromatography (GPC).

The average molecular weight of the ABA triblock copolymer is appropriately selected depending on the intended purpose without any limitation, and examples thereof include the average molecular weight represented by the following formula (III).

$$P(A) \times Mn(A) \times 2 + P(B) \times Mn(B) \quad \text{Formula (III)}$$

In the formula (III), P(A) and P(B) satisfy the formulae (I) and (II).

Here, Mn(A) is a molecular weight of the monomer represented by the general formula (1) or (2), and Mn(B) is a molecular weight of the hydrophilic monomer.

When the average molecular weight is smaller than the range specified by the formula (III), a thickening effect may be low with a low concentration of the ABA triblock copolymer. When the average molecular weight is greater than the range specified by the formula (III), a viscosity of the system before exhibiting a thickening effect may become high.

In the case where the polymerization degree of one A-block and the polymerization degree of the other A-block are different in the ABA triblock copolymer, the average molecular weight of the ABA triblock copolymer is appropriately selected depending on the intended purpose without any limitation, and for example, it is the average molecular weight represented by the following formula (III'):

$$P(A1') \times Mn(A) + P(A2') \times Mn(A) + P(B) \times Mn(B) \quad \text{Formula (III')}$$

In the formula above, the P(A1') represents the polymerization degree of one A-block and the P(A2') represents the polymerization degree of the other A-block in the ABA triblock copolymer.

Note that, in the formula (III'), the P(A1') and the P(A2') satisfy the following formulae, respectively.

$$3 < P(A1') < 10 \quad \text{Formula (I'')}$$

$$3 < P(A2') < 10 \quad \text{Formula (I''')}$$

Moreover, in the formula (III'), P(B) satisfies the formula (II).

Here, Mn(A) is a molecular weight of the monomer represented by the general formula (1) or (2), and Mn(B) is a molecular weight of the hydrophilic monomer.

When the average molecular weight is smaller than the range specified by the formula (III'), a thickening effect may be low in a system having a low concentration of the ABA triblock copolymer. When the average molecular weight is greater than the range specified by the formula (III'), a viscosity of the system before exhibiting a thickening effect may become high.

The number average molecular weight of the ABA triblock copolymer is appropriately selected depending on the intended purpose without any limitation, but it is preferably 10,000 to 300,000, more preferably 50,000 to 100,000.

The number average molecular weight can be measured by gel permeation chromatography (GPC).

The ABA triblock copolymer may contain a residue of an initiator for polymerization, or a residue of a chain transfer agent. The initiator residue and the chain transfer agent residue may be present at terminals of the ABA triblock copolymer, or at a linking part between the A-block and the B-block, or in the B-block.

The ABA triblock copolymer is preferably produced through reversible addition-fragmentation chain transfer (RAFT) polymerization using thiocarbonate (e.g., trithiocarbonate) as a chain transfer agent, in view of achieving a narrow molecular weight distribution. The production of the ABA triblock copolymer through the RAFT polymerization can be confirmed, for example, by the presence of a residue of the chain transfer agent in the polymer. The presence of the residue of the chain transfer agent can be confirmed, for example, by $^1$H-NMR.

In the RAFT polymerization, a polymerization initiator, and a chain transfer agent are used. The chain transfer agent is appropriately selected depending on the intended purpose without any limitation, but preferred are a chain transfer agent having one leaving group, and a chain transfer agent having two leaving groups.

<Production Method of ABA Triblock Copolymer>

The production method of the ABA triblock copolymer is appropriately selected depending on the intended purpose without any limitation, and examples thereof include living radical polymerization.

Examples of the living radical polymerization include atom transfer radical polymerization (ATRP), 2,2,6,6-tetramethylpiperidine-1-oxyl radical (TEMPO) polymerization, and the RAFT polymerization. Among them, the RAFT polymerization is preferable because it is suitable for polymerization of the monomer represented by the general formula (1) and the monomer represented by the general formula (2), a narrow molecular weight distribution can be obtained easily, and polymerization can be easily controlled.

Production of ABA Triblock Copolymer by RAFT Polymerization

Embodiment 1

The production method of an ABA triblock copolymer by the RAFT polymerization (embodiment 1) is appropriately selected depending on the intended purpose without any limitation, and examples thereof include a production method containing an A-block diploid synthesis step, and a B-block synthesis step.

—A-Block Diploid Synthesis Step—

The A-block diploid synthesis step is appropriately selected depending on the intended purpose without any limitation, provided that it is a step for polymerizing the monomer represented by the general formula (1) or the monomer represented by the general formula (2) using a polymerization initiator in the presence of a chain transfer agent.

An A-block diploid, in which two A-blocks are bonded together via the chain transfer agent, can be obtained by the A-block diploid synthesis step.

The chain transfer agent is appropriately selected depending on the intended purpose without any limitation, provided that it is a chain transfer agent, which can be used in the RAFT polymerization, and has two leaving groups. Examples thereof include a thiocarbonyl thio compound. Examples of the thiocarbonyl thio compound include dithioester, dithiocarbamate, trithiocarbonate, and xanthate. Among them trithiocarbonate is preferable, as it does not cause a side reaction, and is suitable for polymerization of acrylic monomers or acrylamide monomers, such as the monomer represented by the general formula (1) and the monomer represented by the general formula (2), more preferably S,S-bis(α, α'-dimethyl-α"-acetic acid)trithiocarbonate.

The polymerization initiator is appropriately selected depending on the intended purpose without any limitation, provided that it is an initiator capable of initiating radical polymerization. Examples of the polymerization initiator include an azo polymerization initiator, a peroxide polymerization initiator, and a persulfuric acid polymerization initiator. Examples of the azo polymerization initiator include 2,2'-azobis(isobutyric acid)dimethyl, 4,4'-azobis(4-cyanovaleric acid), and 2,2'-azobis(isobutyronitrile). Examples of the peroxide polymerization initiator include benzoyl peroxide. Examples of the persulfuric acid polymerization initiator include potassium persulfate, and ammonium persulfate.

The A-block diploid synthesis step can be carried out in a solvent. The solvent is appropriately selected depending on the intended purpose without any limitation, and examples thereof include water, an alcohol solvent, a hydrocarbon solvent, a ketone solvent, an ester solvent, a chloride solvent, an aromatic solvent, and an aprotic polar solvent. Examples of the alcohol solvent include methanol, ethanol, 1-propanol, and isopropanol. Examples of the hydrocarbon solvent include hexane, heptane, octane, decane, and liquid paraffin. Examples of the ketone solvent include acetone, and methyl ethyl ketone. Examples of the ester solvent include methyl acetate, ethyl acetate, and butyl acetate. Examples of the chloride solvent include methylene chloride, chloroform, and carbon tetrachloride. Examples of the aromatic solvent include benzene, and toluene. Examples of the aprotic polar solvent include tetrahydrofuran, N,N-dimethyl formamide, and dimethyl sulfoxide.

The solvent is preferably a solvent having a boiling point that is higher than a radical onset temperature of the polymerization initiator.

The polymerization temperature in the A-block diploid synthesis step is appropriately selected depending on the intended purpose without any limitation, and for example, it is in the range of 50° C. to 100° C.

The polymerization time in the A-block diploid synthesis step is appropriately selected depending on the intended purpose without any limitation, and for example, it is 30 minutes to 24 hours.

The A-block diploid synthesis step is preferably carried out in an inert atmosphere. Examples of the inert atmosphere include argon.

—B-Block Synthesis Step—

The B-block synthesis step is appropriately selected depending on the intended purpose without any limitation, provided that it is a step for polymerizing a hydrophilic monomer in the presence of the A-block diploid obtained by the A-block diploid synthesis step and a polymerization initiator.

In the B-block synthesis step, the bond between the A-block and the chain transfer agent is broken in the A-block diploid, and the hydrophilic monomer is radically added to a terminal of the A-block through fragmentation chain transfer, to grow and react to form an ABA triblock copolymer.

The hydrophilic monomer is the hydrophilic monomer explained in the descriptions of the ABA triblock copolymer.

The polymerization initiator is appropriately selected depending on the intended purpose without any limitation, and examples thereof include those listed as the polymerization initiator in the descriptions of the A-block diploid synthesis step.

Note that, the polymerization initiator used in the A-block diploid synthesis step and the polymerization initiator used in the B-block synthesis step may be the same or different.

The B-block synthesis step can be carried out in a solvent. The solvent is appropriately selected depending on the intended purpose without any limitation, and examples thereof include those listed as the solvent in the descriptions of the A-block diploid synthesis step.

Note that, the solvent used in the A-block diploid synthesis step and the solvent used in the B-block synthesis step may be the same or different.

The polymerization temperature in the B-block synthesis step is appropriately selected depending on the intended purpose without any limitation, and for example, it is in the range of 50° C. to 100° C.

The polymerization time in the B-block synthesis step is appropriately selected depending on the intended purpose without any limitation, and for example, it is 30 minutes to 24 hours.

The B-block synthesis step is preferably carried out in an inert atmosphere. Examples of the inert atmosphere include argon.

Note that, a residue of the chain transfer agent is present in the B-block in the ABA triblock copolymer obtained by the RAFT polymerization (embodiment 1).

Production of ABA Triblock Copolymer by RAFT Polymerization

Embodiment 2

The production method of an ABA triblock copolymer by the RAFT polymerization (embodiment 2) is appropriately selected depending on the intended purpose without any limitation, and examples thereof include a production method containing a first A-block synthesis step, a B-block synthesis step, and a second A-block synthesis step.

—First A-Block Synthesis Step—

The first A-block synthesis step is appropriately selected depending on the intended purpose without any limitation, provided that it is a step for polymerizing the monomer represented by the general formula (1) or the monomer represented by the general formula (2) using a polymerization initiator in the presence of a chain transfer agent.

The first A-block, which is one A-block of the ABA triblock copolymer, is obtained by the first A-block synthesis step. A residue of the chain transfer agent is bonded to a terminal of the first A-block.

The chain transfer agent is appropriately selected depending on the intended purpose without any limitation, provided that it is a chain transfer agent, which is usable in the RAFT polymerization and has one leaving group. Examples of the chain transfer agent include a thiocarbonyl thio compound. Examples of the thiocarbonyl thio compound include dithioester, dithiocarbamate, trithiocarbonate, and xanthate. Among them trithiocarbonate is preferable, as it does not cause a side reaction, and is suitable for polymerization of acrylic monomers or acrylamide monomers, such as the monomer represented by the general formula (1) and the monomer represented by the general formula (2), more preferably 2-methyl-2-[(dodecylsulfanylthiocarbonyl)sulfanyl] propanoic acid.

The polymerization initiator is appropriately selected depending on the intended purpose without any limitation, provided that it is an initiator capable of initiating radical polymerization. Examples of the polymerization initiator include an azo polymerization initiator, a peroxide polymerization initiator, and a persulfuric acid polymerization initiator. Examples of the azo polymerization initiator include 2,2'-azobis(isobutyric acid)dimethyl, 4,4'-azobis(4-cyanovaleric acid), and 2,2'-azobis(isobutyronitrile). Examples of the peroxide polymerization initiator include benzoyl peroxide. Examples of the persulfuric acid polymerization initiator include potassium persulfate, and ammonium persulfate.

The first A-block synthesis step can be carried out in a solvent. The solvent is appropriately selected depending on the intended purpose without any limitation, and examples thereof include water, an alcohol solvent, a hydrocarbon solvent, a ketone solvent, an ester solvent, a chloride solvent, an aromatic solvent, and an aprotic polar solvent. Examples of the alcohol solvent include methanol, ethanol, 1-propanol, and isopropanol. Examples of the hydrocarbon solvent include hexane, heptane, octane, decane, and liquid paraffin. Examples of the ketone solvent include acetone, and methyl ethyl ketone. Examples of the ester solvent include methyl acetate, ethyl acetate, and butyl acetate. Examples of the chloride solvent include methylene chloride, chloroform, and carbon tetrachloride. Examples of the aromatic solvent include benzene, and toluene. Examples of the aprotic polar solvent include tetrahydrofuran, N,N-dimethyl formamide, and dimethyl sulfoxide.

The solvent is preferably a solvent having a boiling point that is higher than radical onset temperature of the polymerization initiator.

The polymerization temperature in the first A-block synthesis step is appropriately selected depending on the intended purpose without any limitation, and for example, it is in the range of 50° C. to 100° C.

The polymerization time in the first A-block synthesis step is appropriately selected depending on the intended purpose without any limitation, and for example, it is 30 minutes to 24 hours.

The first A-block synthesis step can be carried out in an inert atmosphere. Examples of the inert atmosphere include argon.

—B-Block Synthesis Step—

The B-block synthesis step is appropriately selected depending on the intended purpose without any limitation, provided that it is a step for polymerizing a hydrophilic monomer in the presence of the first A-block obtained by the first A-block synthesis step and a polymerization initiator.

In the B-block synthesis step, the bond between the first A-block and the chain transfer agent is broken, and the hydrophilic monomer is radically added to a terminal of the first A-block through fragmentation chain transfer, to grow and react to form a B-block, as a result, an AB diblock copolymer is obtained In the AB diblock copolymer, a residue of the chain transfer agent is bonded to a terminal of the B-block opposite to the side of the A-block.

The hydrophilic monomer is the hydrophilic monomer explained in the descriptions of the ABA triblock copolymer.

The polymerization initiator is appropriately selected depending on the intended purpose without any limitation, and examples thereof include those listed as the polymerization initiator in the descriptions of the first A-block synthesis step.

Note that, the polymerization initiator used in the first A-block synthesis step and the polymerization initiator used in the B-block synthesis step may be the same or different.

The B-block synthesis step can be carried out in a solvent. The solvent is appropriately selected depending on the intended purpose without any limitation, and examples thereof include those listed as the solvent in the descriptions of the first A-block synthesis step.

Note that, the solvent used in the first A-block synthesis step and the solvent used in the B-block synthesis step may be the same or different The polymerization temperature in the B-block synthesis step is appropriately selected depending on the intended purpose without any limitation, and for example, it is in the range of 50° C. to 100° C.

The polymerization time in the B-block synthesis step is appropriately selected depending on the intended purpose without any limitation, and for example, it is 30 minutes to 24 hours.

The B-block synthesis step is preferably carried out in an inert atmosphere. Examples of the inert atmosphere include argon.

—Second A-Block Synthesis Step—

The second A-block synthesis step is appropriately selected depending on the intended purpose without any limitation, provided that it is a step for polymerizing the monomer represented by the general formula (1) or the monomer represented by the general formula (2) in the presence of the AB diblock copolymer obtained by the B-block synthesis step and a polymerization initiator.

In the second A-block synthesis step, the bond between the B-block and the chain transfer agent is broken in the AB diblock copolymer, and the monomer represented by the general formula (1) or the monomer represented by the general formula (2) is radically added to a terminal of the B-block through fragmentation chain transfer, to grow and react to form a second A-block. As a result, an ABA triblock copolymer is obtained.

In the ABA triblock copolymer, a residue of the chain transfer agent is bonded to a terminal of the second A-block opposite to the side of the B-block.

The polymerization initiator is appropriately selected depending on the intended purpose without any limitation, and examples thereof include those listed as the polymerization initiator in the descriptions of the first A-block synthesis step.

Note that the polymerization initiator used in the second A-block synthesis step and the polymerization initiator in the first A-block synthesis step, and the B-block synthesis step may be the same or different.

The second A-block synthesis step can be carried out in a solvent. The solvent is appropriately selected depending on the intended purpose without any limitation, and examples thereof include those listed as the solvent in the descriptions of the first A-block synthesis step.

Note that, the solvent used in the second A-block synthesis step, and the solvent used in the first A-block synthesis step and the B-block synthesis step may be the same or different.

The polymerization temperature in the second A-block synthesis step is appropriately selected depending on the intended purpose without any limitation, and for example, it is in the range of 50° C. to 100° C.

The polymerization time in the second A-block synthesis step is appropriately selected depending on the intended purpose without any limitation, and for example, it is 30 minutes to 24 hours.

The second A-block synthesis step is preferably carried out in an inert atmosphere. Examples of the inert atmosphere include argon.

Note that, a residue of a chain transfer agent is present at a terminal of the A-block in the ABA triblock copolymer produced by the RAFT polymerization (embodiment 2).

The ABA triblock copolymer can be used in a system where an electrolyte is present, has a short response time to a viscosity change, and can exhibit a reversible thickening effect at a low concentration, and therefore the thickener can be suitably applied for drug carriers for a drug delivery system or the like, regenerative medicine materials for tissue engineering or the like, actuators or pumps for artificial muscle, cosmetic materials, display elements, recording elements, energy elements of solar batteries or the like, additives for inks, coating agents for paper for certain use, and various functional films.

(Thickener)

The thickener of the present invention contains the ABA triblock copolymer of the present invention.

The thickener exhibits a thickening effect due to a change in pH of a system containing the thickener to thereby thicken the system. The viscosity change by the thickening is reversible.

The thickener exhibits a thickening effect even when an electrolyte is present in a system, and therefore it is particularly suitable as a thickener for an electrolyte-containing aqueous composition.

The electrolyte-containing aqueous composition contains at least water and an electrolyte, and may further contain other components, if necessary.

The electrolyte is appropriately selected depending on the intended purpose without any limitation, and examples thereof include an inorganic alkali metal salt, an organic alkali metal salt, and an ammonium salt.

Examples of the inorganic alkali metal salt include sodium chloride, potassium chloride, lithium chloride, rubidium chloride, sodium bromide, sodium iodide, sodium sulfate, sodium sulfite, sodium hydrogen sulfite, sodium thiosulfate, potassium sulfate, sodium nitrate, sodium nitrite, potassium nitrate, sodium phosphate, sodium carbonate, and sodium hydrogen carbonate.

Examples of the organic alkali metal include sodium acetate, potassium acetate, sodium oxalate, sodium citrate, sodium hydrogen citrate, potassium citrate, and potassium hydrogen citrate.

Examples of the ammonium salt include ammonium chloride, ammonium nitrate, ammonium sulfate, tetramethylammonium chloride, tetramethylammonium nitrate, and choline chloride.

Moreover, further examples of the electrolyte include a monovalent alkali metal salt, and a bivalent or higher metal salt. Among them, a monovalent alkali metal salt is preferable as it does not adversely affect solubility and dispersibility of the ABA triblock copolymer.

An amount of the electrolyte in the electrolyte-containing aqueous composition is appropriately selected depending on the intended purpose without any limitation.

The thickener can be used in a system where an electrolyte is present, has a short response time to a viscosity change, and can exhibit a reversible thickening effect at a low concentration, and therefore the thickener can be suitably applied for drug carriers for a drug delivery system or the like, regenerative medicine materials for tissue engineering or the like, actuators or pumps for artificial muscle, cosmetic materials, display elements, recording elements, energy elements of solar batteries or the like, additives for inks, coating agents for paper for certain use, and various functional films.

(Aqueous Composition)

The aqueous composition of the present invention contains at least the ABA triblock copolymer of the present invention or the thickener of the present invention, and water, and may further contain other components, such as an electrolyte, if necessary.

The aqueous composition is thickened by a thickening effect of the ABA triblock copolymer or the thickener by a change, as the pH of the aqueous composition changes. The viscosity change by thickening is reversible.

An amount of the ABA triblock copolymer in the aqueous composition is appropriately selected depending on the intended purpose without any limitation, but it is preferably 2% by mass or greater, more preferably 3% by mass or greater, and even more preferably 5% by mass or greater. The upper limit thereof is appropriately selected depending on the intended purpose without any limitation, but it is preferably 30% by mass less. When the amount thereof is greater than 30% by mass, a viscosity of a system become high even before exhibiting a thickening effect.

<Electrolyte>

A typical pH-responsive polymer loses most of a thickening effect due to the presence of an electrolyte, but the ABA triblock copolymer or the thickener exhibits a thickening effect in the presence of the electrolyte.

The electrolyte is appropriately selected depending on the intended purpose without any limitation, and examples thereof include those listed as the electrolyte in the descriptions of the thickener. The preferable embodiment thereof is also the same as in the descriptions of the thickener.

An amount of the electrolyte in the aqueous composition is appropriately selected depending on the intended purpose without any limitation.

<Other Components>

Other components are appropriately selected depending on the intended purpose without any limitation, and examples thereof include medicine, DNA, protein, a cell, a moisturizing agent, a surfactant, an antioxidant, a chelating agent, a pH regulator, an antiseptic agent, an insecticide, a pesticide, perfume, a UV absorber, a dye, a water-soluble polymer exclusive of the ABA triblock copolymer, O/W emulsion, W/O/W emulsion, resin emulsion, an organic pigment, an inorganic pigment, cellulose, a carbon nanotube, a carbon nanofiber, and a cellulose fiber.

The aqueous composition may be an aqueous composition, which is turned from a flowable sol state into a non-flowable gel state by a change in pH, or an aqueous composition, which turned from a non-flowable gel state into a flowable sol state by a change in pH.

The aqueous composition can be used in a system where an electrolyte is present, has a short response time to a viscosity change, and can exhibit a reversible thickening effect at a low concentration, and therefore the aqueous composition can be suitably used for cosmetic materials, and inks.

EXAMPLES

Examples of the present invention will be explained hereinafter, but Examples below shall not be construed as to limit the scope of the present invention.

In Examples, JEOL JNM-ECX500 FT NMR SYSTEM (manufactured by JEOL Ltd.) was used for $^1$H-NMR spectroscopy, and a conductivity meter ES-51(manufactured by HORIBA, Ltd.) was used the measurement of electric conductivity.

GPC was performed under the following conditions:
[Measuring conditions for molecular weight of AaU(X) (A-block only)]
Pump: PU-2085plus (manufactured by JASCO Corporation)
Column oven: U-620 TYPE30 (manufactured by Suga-ichemi)
Refractive index detector: RISE-61 (manufactured by SHOWA DENKO K.K.)
Column:
  Shodex Asahipak GF-1G 7B (one guard column, manufactured by SHOWA DENKO K.K.)
  Shodex Asahipak GF-7M HQ (one analysis column, manufactured by SHOWA DENKO K.K.)
Eluent:
  0.1M $LiClO_4$ methanol solution
[Measuring Conditions of Molecular Weights of ABA Triblock Copolymers of Examples 1 to 9]
Degasser: ERC 3215 alpha (manufactured by SHOWA DENKO K.K.)
Pump: DP-8020 (manufactured by Tosoh Corporation)
Column oven: CTO-10ASVP (manufactured by Shimadzu Corporation)
Refractive index detector: RI-8020 (manufactured by Tosoh Corporation)
Column:
  Shodex OHpak SB-G (one guard column, manufactured by SHOWA DENKO K.K.)
  Shodex OHpak SB-804HQ (two analysis columns, manufactured by SHOWA DENKO K.K.)
Eluent:
  acetonitrile: water (pH 8, 50 mM phosphoric acid)=10:90 (volume ratio)
[Measuring Conditions for Molecular Weights of ABA Triblock Copolymers of Examples 10 to 13]
Device: HLC-8220GPC (manufactured by Tosoh Corporation)
Column: Shodex HFIP-LG+HFIP-806M×two columns
Detector: a refractive index detector (RI)
Eluent: HFLP+10 mM $CF_3COONa$ Synthesis Example 1

Synthesis of 11-Acrylamide Undecanoic Acid (AaU)

In 1.5 L of deionized water, 40.3 g of 11-aminoundecanoic acid, and 36 g of sodium hydroxide were dissolved. To the resulting solution, a mixture containing 56.6 g of acryloyl chloride and 0.1 g of a polymerization inhibitor (2,6-di-tert-butyl-p-cresol) was added dropwise over about 15 minutes. Thereafter, the mixture was stirred for 3 hours at room temperature, followed by adjusting the pH of the mixture with 6N hydrochloric acid, to thereby obtain a sedimentary deposit. The obtained sedimentary deposit was collected by suction filtration. The collected material was dissolved in acetone, and was reprecipitated with hexane to thereby obtain a sedimentary deposit. The obtained sedimentary deposit was again collected by suction filtration, and the collected material was vacuum dried, to thereby obtain 11-acrylamide undecanoic acid (AaU). The $^1$H-NMR spectrum of the obtained 11-acrylamide undecanoic acid is depicted in FIG. 1.

Synthesis Example 2

Synthesis of Chain Transfer Agent (S,S-Bis($\alpha,\alpha'$-Dimethyl-$\alpha''$-Acetic Acid)Trithiocarbonate)

A mixture containing 27.4 g of carbon disulfide, 107.5 g of chloroform, 52.3 g of acetone, 2.29 g of tetrabutylammonium bromide, and 120 mL of mineral sprit was deaerated with argon for 10 minutes. Subsequently, to the deaerated mixture in an ice bath, a 50% by mass sodium hydroxide aqueous solution was added over about 90 minutes in an argon atmosphere, and the mixture was stirred for about 9 hours. To the resultant, 900 mL of deionized water was added, and then 120 mL of 12M hydrochloric acid was added. Subsequently, the resultant was stirred for about 30 minutes in an ice bath in an argon atmosphere, to obtain a yellow ocher sedimentary deposit. The obtained sedimentary deposit was collected by suction filtration. The collected material was vacuum dried at 50° C. to obtain partially purified product was dissolved in acetone, and was reprecipitated with hexane to further carry out purification, to thereby obtain S,S-bis($\alpha,\alpha'$-dimethyl-$\alpha''$-acetic acid)trithiocarbonate, as a chain transfer agent.

Figure 2:
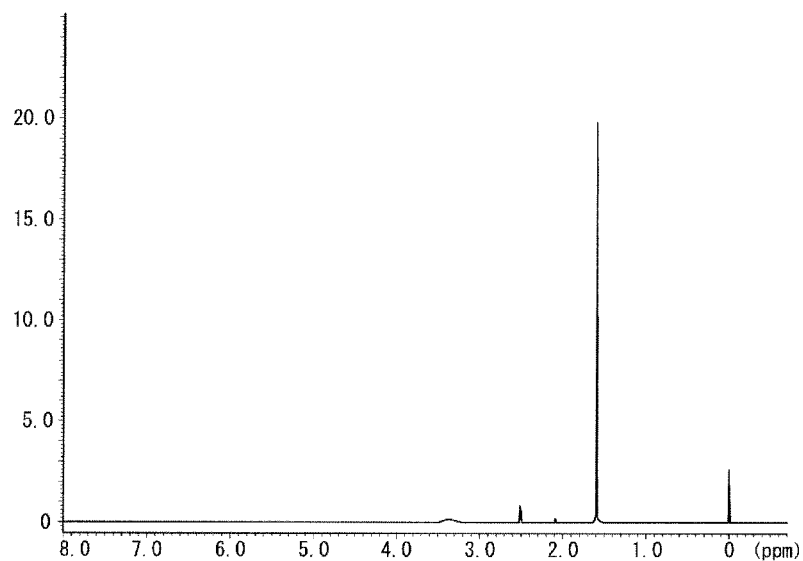
FIG. 2 is the $^1$H-NMR spectrum of S,S-bis($\alpha,\alpha'$-dimethyl-$\alpha''$-acetic acid)tricarbonate obtained in Synthesis Example 2.

The $^1$H-NMR spectrum of the obtained S,S-bis($\alpha,\alpha'$-dimethyl-$\alpha''$-acetic acid)trithiocarbonate is depicted in FIG. 2.

Example 1

Synthesis of ABA Triblock Copolymer [AaU(5)-DMA(900)-AaU(5)]

An ABA triblock copolymer was synthesized by RAFT polymerization. The method thereof is described below.
—Synthesis of Decamer of AaU—

In 7.5 mL of methanol, 1.92 g of AaU obtained in Synthesis Example 1, 0.21 g of the chain transfer agent obtained in Synthesis Example 2, and 0.084 g of 4,4'-azobis(4-cyanovaleric acid) serving as a polymerization initiator were dissolved, and the resultant was deaerated for 30 minutes with argon. The methanol solution after the deaeration was heated to 70° C. to perform polymerization for 4.5 hours. After the polymerization, hexane was added, and the separated methanol solution was collected. The collected methanol solution was vacuum dried, to thereby obtain a polymer.

The obtained polymer was subjected to $^1$H-NMR spectroscopy using deuterated dimethyl sulfoxide (d6-DMSO) as a solvent, and the average polymerization degree was calculated by comparing a methyl peak of the chain transfer agent, and a methylene peak derived from AaU. As a result, it was confirmed that the polymer was a decamer of AaU [AaU(10)] having the average polymerization degree of 10.

Figure 3:
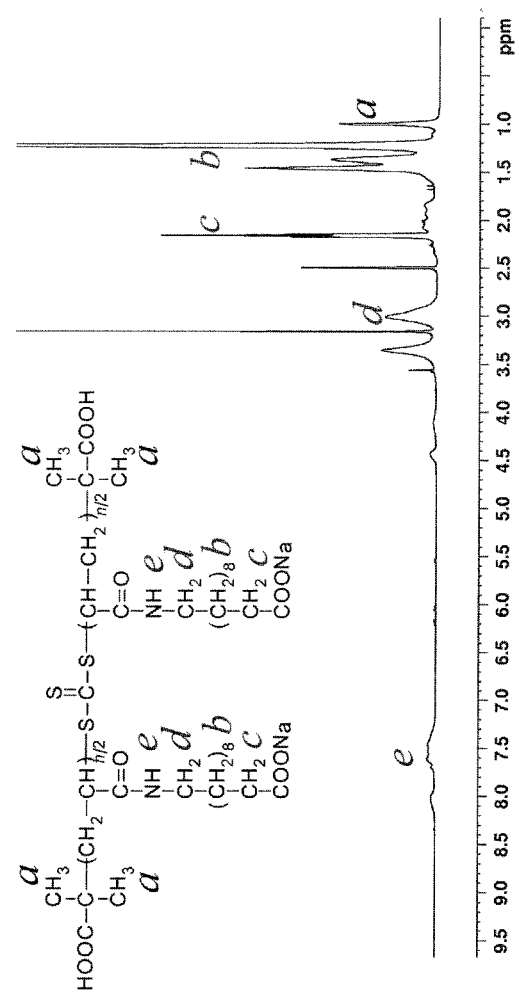
FIG. 3 is the $^1$H-NMR spectrum of the decamer of 11-acrylamide undecanoic acid obtained in Example 1.

The $^1$H-NMR spectrum (in d6-DMSO) of the obtained decamer of 11-acrylamide undecanoic acid is depicted in FIG. 3.

Figure 4:
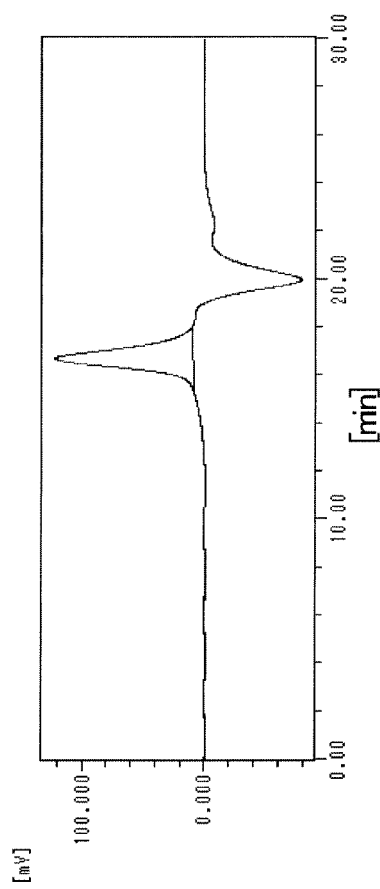
FIG. 4 is the GPC chart of the decamer of 11-acrylamide undecanoic acid obtained in Example 1.

The GPC chart of the obtained decamer of 11-acrylamide undecanoic acid is depicted in FIG. 4. The molecular weight distribution (Mw/Mn) thereof was 1.15.
—Synthesis of ABA Triblock Copolymer—

In 100 mL of methanol, 0.567 g of the obtained AaU (10), 19.83 g of dimethylacryl amide (DMA), and 0.0131 g of 2,2'-azobis(isobutyronitrile) serving as a polymerization initiator were dissolved, and the resulting solution was deaerated with argon for 30 minutes. The methanol solution after the deaeration was heated to 60° C. to perform polymerization for 4.5 hours. After the polymerization, the methanol solution was poured onto a dialysis membrane (dialysis membrane 36/32, product number: UC 36-32-100, manufactured by EIDIA Co., Ltd.) to perform dialysis using water for 16 hours, and the pH was adjusted to 9, and dialysis was further performed with water for 6 hours. The obtained solution was concentrated, followed by freeze-dried, to thereby obtain an ABA triblock copolymer.

The obtained ABA triblock copolymer was subjected to $^1$H-NMR spectroscopy using heavy water as a solvent, and the average polymerization degree was calculated by comparing a methyl peak derived from DMA and a methylene peak derived from AaU. As a result, it was found that the obtained ABA triblock copolymer was an ABA triblock copolymer [AaU(5)-DMA(900)-AaU(5)], in which the average polymerization degree of A-block was 5, and the average polymerization degree of B-block was 900.

Moreover, gel permeation chromatography (GPC) was performed on the obtained ABA triblock copolymer in phosphoric acid buffer, and it was found that the molecular weight distribution (Mw/Mn) thereof was 1.17.

Figure 5:
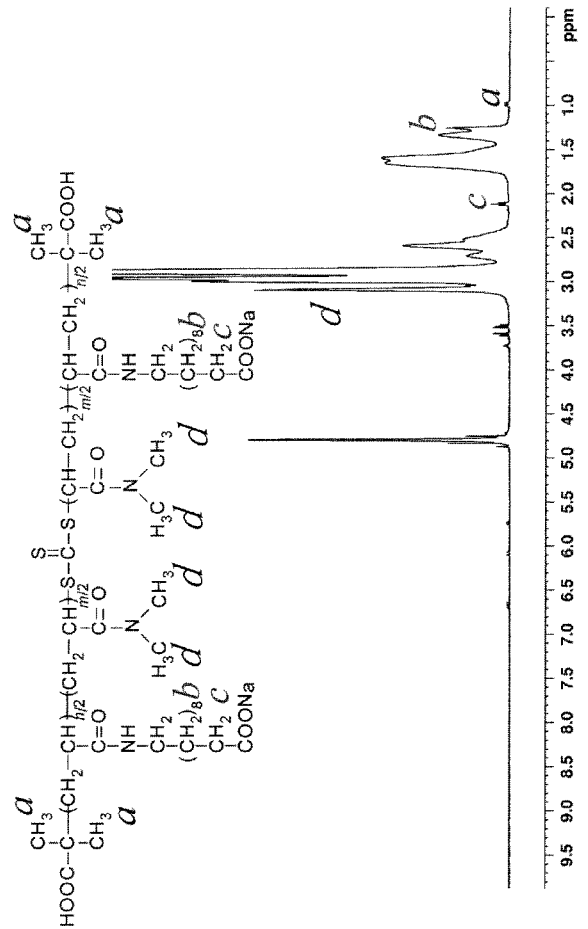
FIG. 5 is the $^1$H-NMR spectrum of the ABA triblock copolymer obtained in Example 1.

The $^1$H-NMR spectrum (in $D_2O$) of the ABA triblock copolymer obtained in Example 1 is depicted in FIG. 5.

Figure 6:
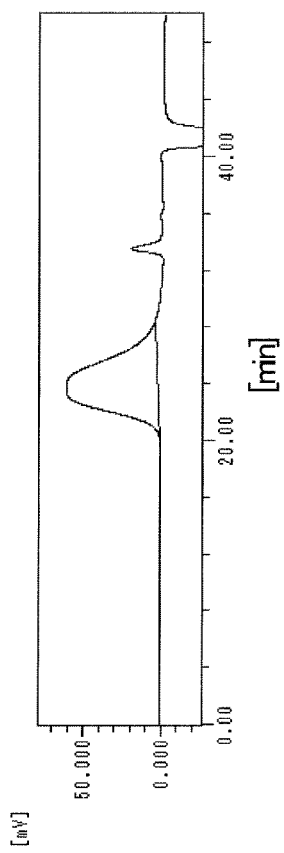
FIG. 6 is the GPC chart of the ABA triblock copolymer obtained in Example 1.

The GPC chart of the ABA triblock copolymer obtained in Example 1 is depicted in FIG. 6.

Example 2

Synthesis of ABA Triblock Copolymer [AaU(5)-DMA(400)-AaU(5)]

In 10.9 mL of methanol, 0.121 g of AaU (10) obtained in Example 1, 2.01 g of dimethylacryl amide (DMA), and 0.0059 g of 2,2'-azobis(isobutyronitrile) serving as a polymerization initiator were dissolved, and the resulting solution was deaerated with argon for 30 minutes. The methanol solution after the deaeration was heated to 60° C. to carry out polymerization for 4.5 hours. Purification after the polymerization was performed in the same manner as in Example 1, to thereby obtain an ABA triblock copolymer.

The average polymerization degree was calculated by $^1$H-NMR spectroscopy in the same manner as in Example 1. As a result, the obtained ABA triblock copolymer was an ABA triblock copolymer [AaU(5)-DMA(400)-AaU(5)] in which the average polymerization degree of the A-block was 5, and the average polymerization degree of the B-block was 400.

Moreover, gel permeation chromatography (GPC) was performed on the obtained ABA triblock copolymer in phosphoric acid buffer, and it was found that the molecular weight distribution (Mw/Mn) thereof was 1.11.

Figure 7:
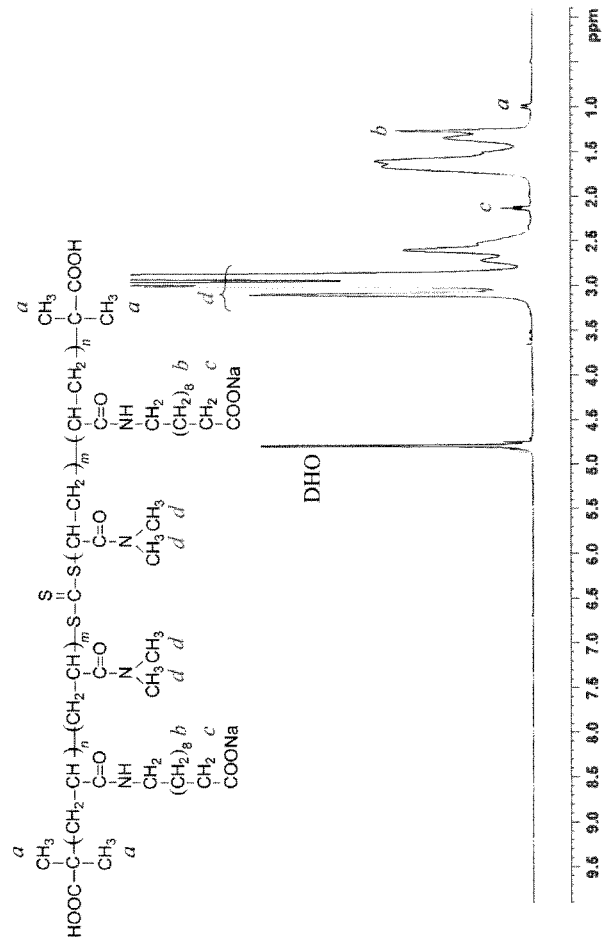
FIG. 7 is the $^1$H-NMR spectrum of the ABA triblock copolymer obtained in Example 2.

The $^1$H-NMR spectrum (in $D_2O$) of the ABA triblock copolymer obtained in Example 2 is depicted in FIG. 7.

Figure 8:
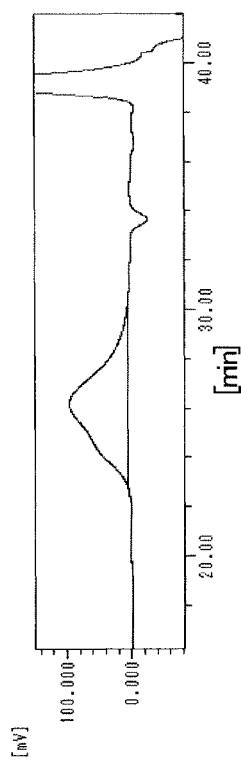
FIG. 8 is the GPC chart of the ABA triblock copolymer obtained in Example 2.

The GPC chart of the ABA triblock copolymer obtained in Example 2 is depicted in FIG. 8.

Example 3

Synthesis of ABA Triblock Copolymer [AaU(5)-DMA(200)-AaU(5)]

In 10.9 mL methanol, 0.240 g of the AaU (10) obtained in Example 1, 2.00 g of dimethylacryl amide(DMA), and 0.012 g of 2,2'-azobis(isobutyronitrile) serving as a polymerization initiator were dissolved, and the resulting solution was deaerated with argon for 30 minutes. The methanol solution after the deaeration was heated to 60° C. to carry out polymerization for 4.5 hours. Purification after the polymerization was performed in the same manner as in Example 1, to thereby obtain an ABA triblock copolymer.

The average polymerization degree was calculated by $^1$H-NMR spectroscopy in the same manner as in Example 1. As a result, it was found that the obtained ABA triblock copolymer was an ABA triblock copolymer [AaU(5)-DMA(200)-AaU(5)], in which the average polymerization degree of A-block was 5, and the average polymerization degree of B-block was 200.

Moreover, gel permeation chromatography (GPC) was performed on the obtained ABA triblock copolymer in phosphoric acid buffer, and it was found that the molecular weight distribution (Mw/Mn) thereof was 1.14.

Figure 9:
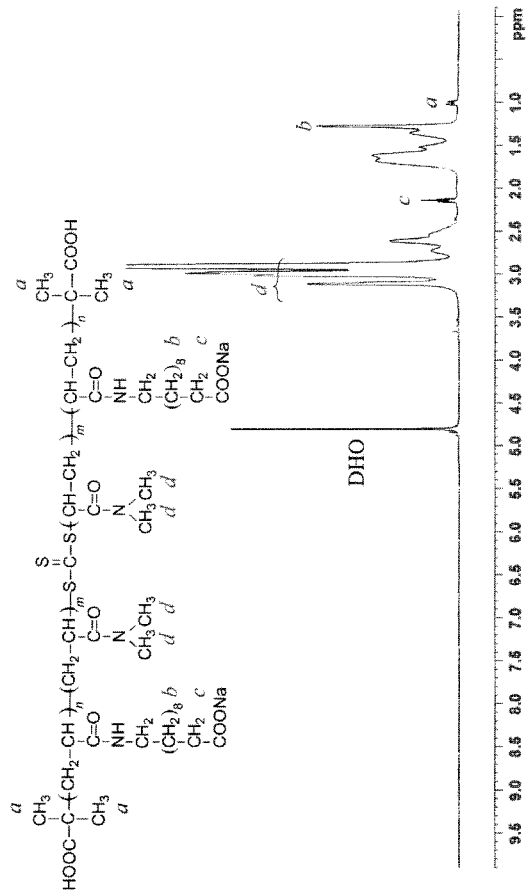
FIG. 9 is the $^1$H-NMR spectrum of the ABA triblock copolymer obtained in Example 3.

The $^1$H-NMR spectrum (in $D_2O$) of the ABA triblock copolymer obtained in Example 3 is depicted in FIG. 9.

Figure 10:
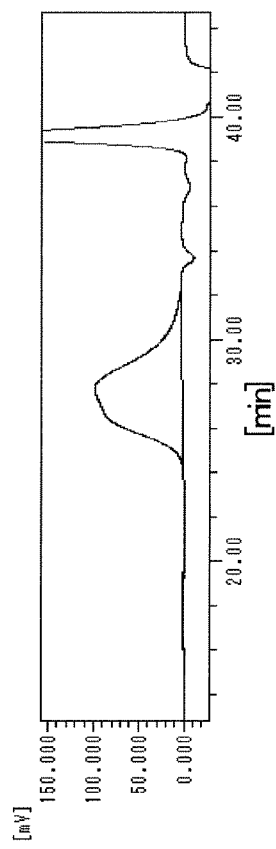
FIG. 10 is the GPC chart of the ABA triblock copolymer obtained in Example 3.

The GPC chart of the ABA triblock copolymer obtained in Example 3 is depicted in FIG. 10.

Example 4

Synthesis of ABA Triblock Copolymer [AaU(5)-DMA(2300)-AaU(5)]

In 13.5 mL of methanol, 0.0391 g of AaU (10) obtained in Example 1, 2.61 g of dimethylacryl amide (DMA), and 0.0021 g of 2,2'-azobis(isobutyronitrile) serving as a polymerization initiator were dissolved, and a resulting solution was deaerated with argon for 30 minutes. The methanol solution after the deaeration was heated to 60° C. to carry out polymerization for 4.5 hours. Purification after the polymerization was performed in the same manner as in Example 1, to thereby obtain an ABA triblock copolymer.

The average polymerization degree was calculated by $^1$H-NMR spectroscopy in the same manner as in Example 1. As a result, it was found that the obtained ABA triblock copolymer was an ABA triblock copolymer [AaU(5)-DMA(2300)-AaU(5)], in which the average polymerization degree of A-block was 5, and the average polymerization degree of B-block was 2,300.

Moreover, gel permeation chromatography (GPC) was performed on the obtained ABA triblock copolymer in phosphoric acid buffer, and it was found that the molecular weight distribution (Mw/Mn) thereof was 1.22.

Figure 11:
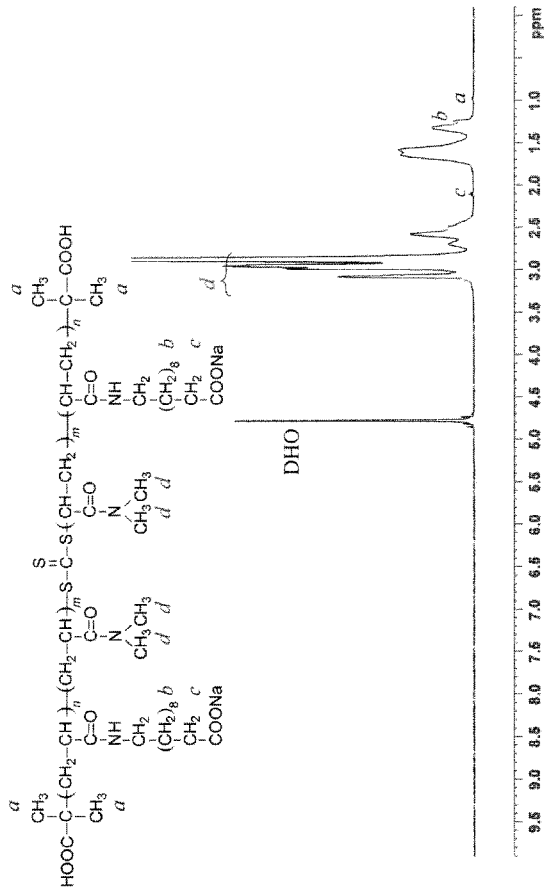
FIG. 11 is the $^1$H-NMR spectrum of the ABA triblock copolymer obtained in Example 4.

The $^1$H-NMR spectrum (in $D_2O$) of the ABA triblock copolymer obtained in Example 4 is depicted in FIG. 11.

Figure 12:
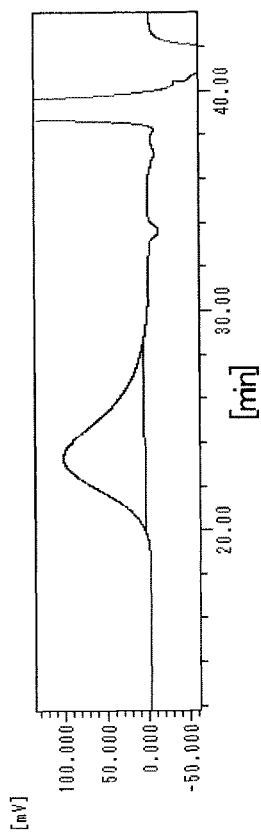
FIG. 12 is the GPC chart of the ABA triblock copolymer obtained in Example 4.

The GPC chart of the ABA triblock copolymer obtained in Example 4 is depicted in FIG. 12.

Example 5

Synthesis of ABA Triblock Copolymer[AaU(3)-DMA(900)-AaU(3)]

—Synthesis of Hexamer of AaU—

In 4.5 mL of methanol, 1.15 g of AaU obtained in Synthesis Example 1, 0.21 g of the chain transfer agent obtained in Synthesis Example 2, and 0.084 g of 4,4'-azobis(4-cyanovaleric acid) serving as a polymerization initiator were dissolved, and the resulting solution was deaerated with argon for 30 minutes. The methanol solution after the deaeration was heated to 70° C. to carry out polymerization for 4.5 hours. After the polymerization, hexane was added to separate the methanol solution, and the separated methanol solution was collected. The collected methanol solution was vacuum dried, to thereby obtain a polymer.

The obtained polymer was subjected to $^1$H-NMR spectroscopy using deuterated dimethyl sulfoxide as a solvent, and the polymerization degree was calculated by comparing a methyl peak of the chain transfer agent and a methylene peak derived from AaU. As a result, it was confirmed that the polymer was a hexamer of AaU [AaU(6)] having the average polymerization degree of 6.

—Synthesis of ABA Triblock Copolymer—

In 10 mL of methanol, 0.0409 g of the obtained AaU (6), 2.13 g of dimethylacryl amide (DMA), and 0.0196 g of 2,2'-azobis(isobutyronitrile) serving as a polymerization initiator were dissolved, and the resulting solution was deaerated with argon for 30 minutes. The methanol solution after the deaeration was heated to 60° C. to carry out polymerization for 4.5 hours. Purification after the polymerization was performed in the same manner as in Example 1, to thereby obtain an ABA triblock copolymer.

The average polymerization degree was calculated by $^1$H-NMR spectroscopy in the same manner as in Example 1. As a result, it was found that the obtained ABA triblock copolymer was an ABA triblock copolymer [AaU(3)-DMA(900)-AaU(3)], in which the average polymerization degree of A-block was 3, and the average polymerization degree of B-block was 900.

Moreover, gel permeation chromatography (GPC) was performed on the obtained ABA triblock copolymer in phosphoric acid buffer, and it was found that the molecular weight distribution (Mw/Mn) thereof was 1.10.

Figure 13:
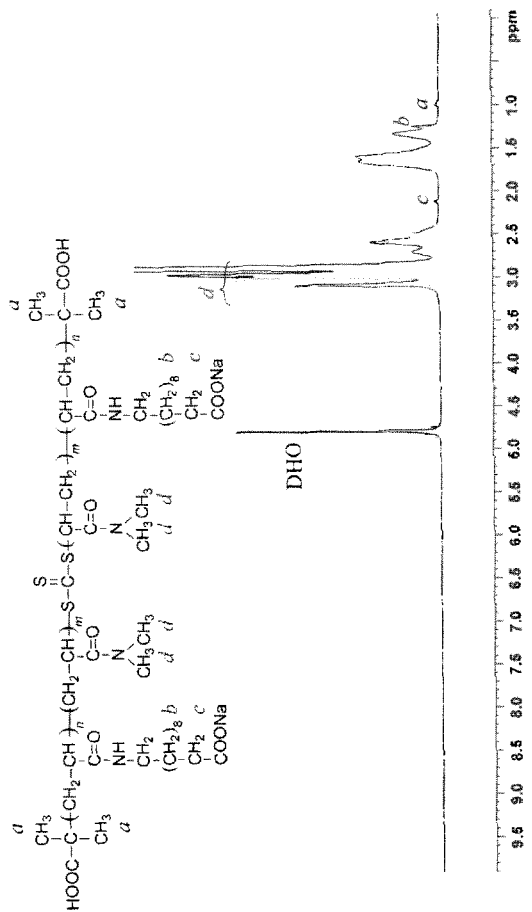
FIG. 13 is the $^1$H-NMR spectrum of the ABA triblock copolymer obtained in Example 5.

The $^1$H-NMR spectrum (in $D_2O$) of the ABA triblock copolymer obtained in Example 5 is depicted in FIG. 13.

The GPC chart of the ABA triblock copolymer obtained in Example 5 is depicted in FIG. 14.

Example 6

Synthesis of ABA Triblock Copolymer[AaU(5)-PSSNa(200)-AaU(5)]

In 7.5 mL of methanol, 0.0717 g of AaU (10) obtained in Example 1, 1.04 g of sodium p-styrene sulfonate (PSSNa), and 0.0015 g of 4,4'-azobis(4-cyanovaleric acid) serving as a polymerization initiator, and the resulting solution was deaerated with argon for 30 minutes. The methanol solution after the deaeration was heated to 70° C. to carry out polymerization for 3 hours. Purification after the polymerization was performed in the same manner as in Example 1, to thereby obtain an ABA triblock copolymer.

The average polymerization degree was calculated by $^1$H-NMR spectroscopy in the same manner as in Example 1. As a result, it was found that the obtained ABA triblock copolymer was an ABA triblock copolymer [AaU(5)-PSSNa(200)-AaU(5)], in which the average polymerization degree of A-block was 5, and the average polymerization degree of B-block was 200.

Moreover, gel permeation chromatography (GPC) was performed on the obtained ABA triblock copolymer in phosphoric acid buffer, and it was found that the molecular weight distribution (Mw/Mn) thereof was 4.51.

The GPC chart of the ABA triblock copolymer obtained in Example 6 is depicted in FIG. 15.

Example 7

Synthesis of ABA Triblock Copolymer [AaU(5)-AMPS(200)-AaU(5)]

In 7.5 mL of methanol, 0.0717 g of AaU (10) obtained in Example 1, 1.04 g of 2-acryl amide-2-methylpropane sulfonic acid (AMPS), and 0.0015 g of 4,4'-azobis(4-cyanovaleric acid) serving as a polymerization initiator were dissolved, and the resulting solution was deaerated with argon for 30 minutes. The methanol solution after the deaeration was heated to 70° C. to carry out polymerization for 3 hours. Purification after the polymerization was performed in the same manner as in Example 1, to thereby obtain an ABA triblock copolymer.

The average polymerization degree was calculated by $^1$H-NMR spectroscopy in the same manner as in Example 1. As a result, it was found that the obtained ABA triblock copolymer was an ABA triblock copolymer [AaU(5)-AMPS(200)-AaU(5)], in which the average polymerization degree of A-block was 5, and the average polymerization degree of B-block was 200.

Moreover, gel permeation chromatography (GPC) was performed on the obtained ABA triblock copolymer in phosphoric acid buffer, and it was found that the molecular weight distribution (Mw/Mn) thereof was 2.03.

Figure 16:
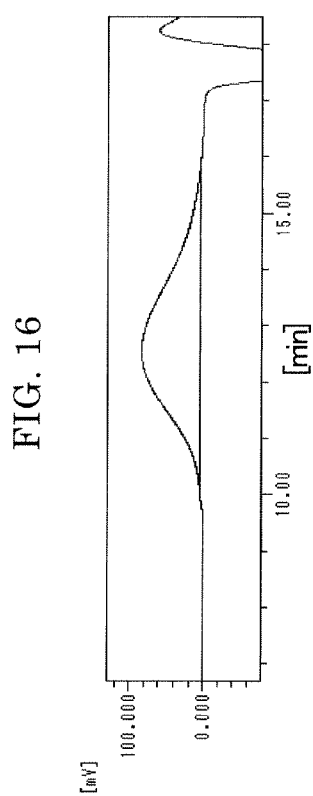
FIG. 16 is the GPC chart of the ABA triblock copolymer obtained in Example 7.

The GPC chart of the ABA triblock copolymer obtained in Example 7 is depicted in FIG. 16.

Example 8

Synthesis of ABA Triblock Copolymer[AaH(25)-DMA(200)-AaH(25)]

—Synthesis of 50-Mer of AaH—

In 4.3 mL of water, 2.011 g (10.86 mmol) of 6-acrylamidehexanoic acid (manufactured by Tokyo Chemical Industry Co., Ltd., AaH), and 0.826 g (9.673 mmol) of $NaHCO_3$ were dissolved, to thereby obtain an aqueous solution.

In 1.1 mL methanol, 61.4 mg (0.217 mmol) of S,S-bis(α,α'-dimethyl-α"-acetic acid)trithiocarbonate, which was a chain transfer agent synthesized in Synthesis Example 2, and 30.9 mg (0.110 mmol) of 4,4'-azobis(4-cyanovaleric acid) serving as a polymerization initiator were dissolved to thereby obtain a methanol solution.

The aqueous solution and the methanol solution were mixed to obtain a methanol aqueous solution. The obtained methanol aqueous solution was deaerated with argon for 30 minutes, and after the deaeration, the methanol aqueous solution was heated to 70° C. to carry out polymerization for 30 minutes. After the polymerization, dialysis was performed with water for 6 hours, and the resultant was freeze dried to obtain a polymer. The obtained polymer was subjected to $^1$H-NMR spectroscopy using heavy water as a solvent, and the average polymerization degree was calculated by comparing a methyl peak of the chain transfer agent, and a methylene peak derived from AaH. As a result, it was confirmed that the polymer was 50-mer of AaH [AaH (50)] having the average polymerization degree of 50.

Figure 17:
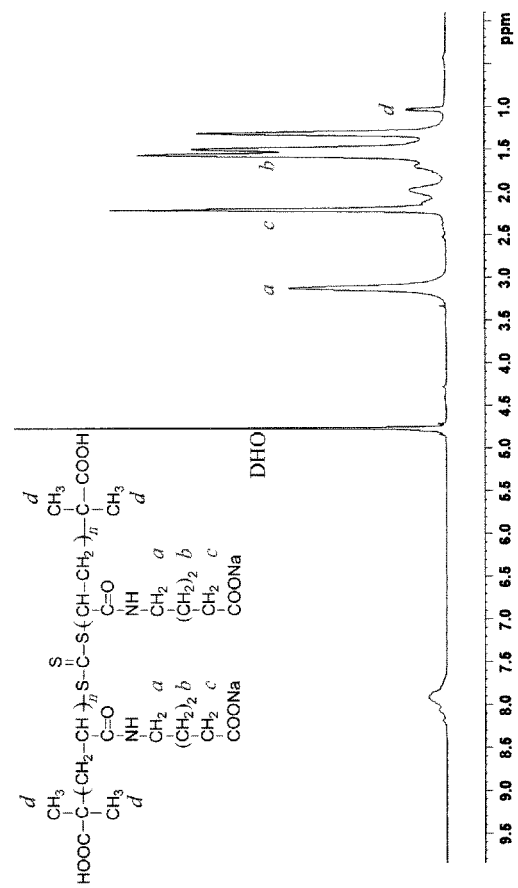
FIG. 17 is the $^1$H-NMR spectrum of the 50-mer of 6-acrylamidehexanoic acid obtained in Example 8.

The $^1$H-NMR spectrum of the obtained 50-mer of 6-acrylamidehexanoic acid is depicted in FIG. 17.

Figure 18:
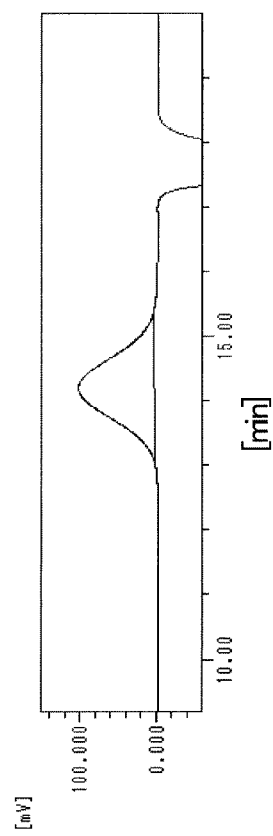
FIG. 18 is the GPC chart of the 50-mer of 6-acrylamidehexanoic acid obtained in Example 8.

The GPC chart of the obtained 50-mer of 6-acrylamidehexanoic acid is depicted in FIG. 18. The molecular weight distribution (Mw/Mn) thereof was 1.09.

—Synthesis of AaH(25)-DMA(200)-AaH(25)—

In 10 mL of water, 0.503 g (0.0508 mmol) of the obtained AaH (50), 1.001 g (10.097 mmol) of dimethylacryl amide (DMA), and 2.93 mg (0.0105 mmol) of 4,4'-azobis(4-cyanovaleric acid) serving as a polymerization initiator were dissolved. The resulting solution was deaerated with argon for 30 minutes, and after the deaeration, the solution was heated to 70° C. to carry out polymerization for 60 minutes. After the polymerization, dialysis was performed for 48 hours with water, and the resultant was subjected to freeze-drying to thereby obtain a polymer. The obtained polymer was subjected to $^1$H-NMR spectroscopy using heavy water as a solvent. As a result, it was confirmed that the obtained polymer was an ABA triblock copolymer [AaH(25)-DMA(200)-AaH(25)], in which the average polymerization degree of DMA was 200.

Figure 19:
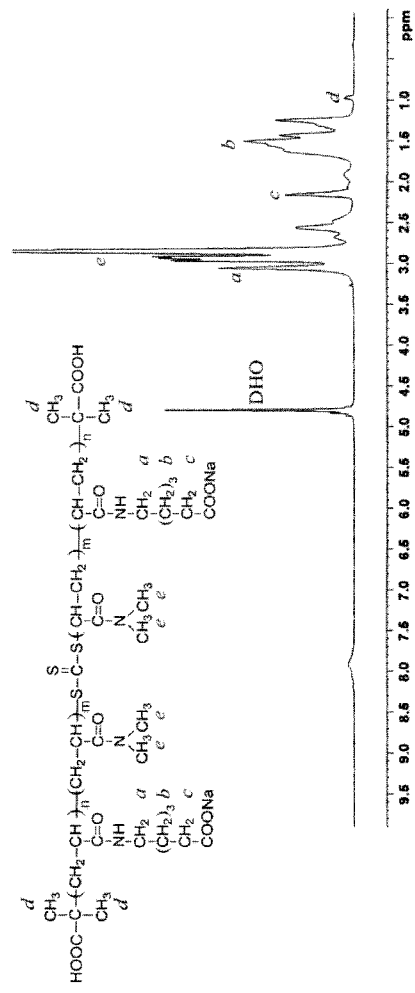
FIG. 19 is the $^1$H-NMR spectrum of the ABA triblock copolymer obtained in Example 8.

The $^1$H-NMR spectrum of the obtained ABA triblock copolymer [AaH(25)-DMA(200)-AaH(25)] is depicted in FIG. 19.

Figure 20:
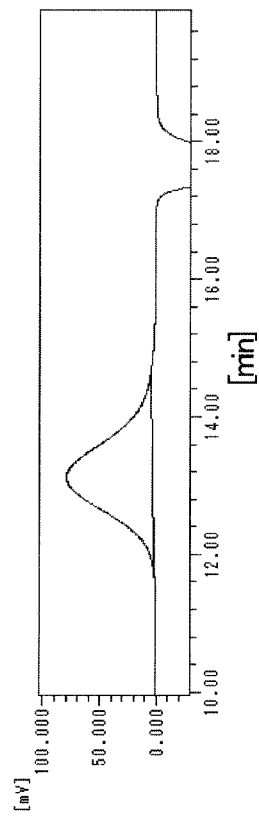
FIG. 20 is the GPC chart of the ABA triblock copolymer obtained in Example 8.

The GPC chart of the obtained ABA triblock copolymer [AaH(25)-DMA(200)-AaH(25)] is depicted in FIG. 20. The molecular weight distribution (Mw/Mn) thereof was 1.12.

Example 9

Synthesis of ABA Triblock Copolymer [AaH(25)-PSSNa(200)-AaH(25)]

In 7.5 mL of water, 0.250 g (0.0253 mmol) of AaH (50), 1.040 g (5.045 mmol) of sodium p-styrene sulfonate (PSSNa), and 1.45 mg (0.00517 mmol) of 4,4'-azobis(4-cyanovaleric acid) serving as a polymerization initiator were dissolved, and the resulting solution was deaerated with argon for 30 minutes. After the deaeration, the solution was heated to 70° C. to carry out polymerization for 180 minutes. After the polymerization, dialysis was performed with water for 48 hours, and the resultant was freeze dried to thereby obtain a polymer. The obtained polymer was subjected to $^1$H-NMR spectroscopy using heavy water as a solvent. As a result, it was found that the obtained polymer was an ABA triblock copolymer [AaH(25)-PSSNa(200)-AaH(25)], in which the average polymerization degree of PSSNa was 200.

Figure 21:
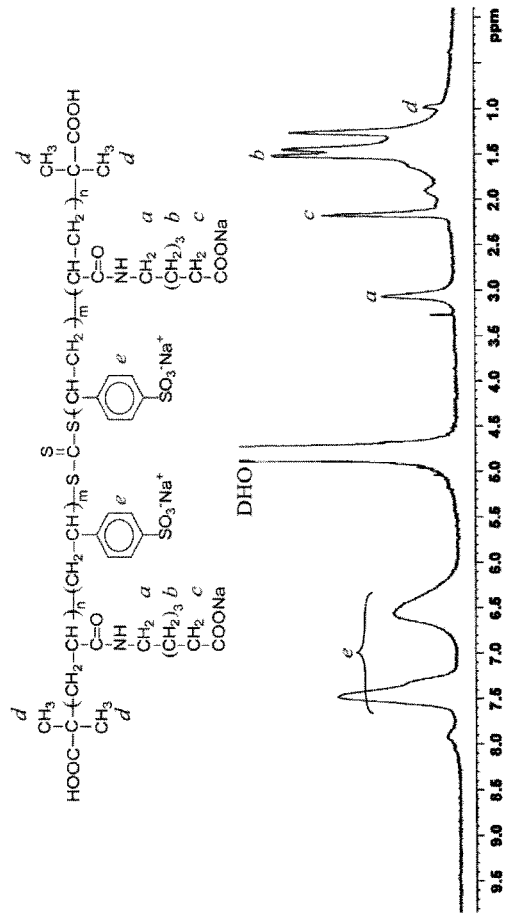
FIG. 21 is the $^1$H-NMR spectrum of the ABA triblock copolymer obtained in Example 9.

The $^1$H-NMR spectrum of the obtained ABA triblock copolymer [AaH(25)-PSSNa(200)-AaH(25)] is depicted in FIG. 21.

Figure 22:
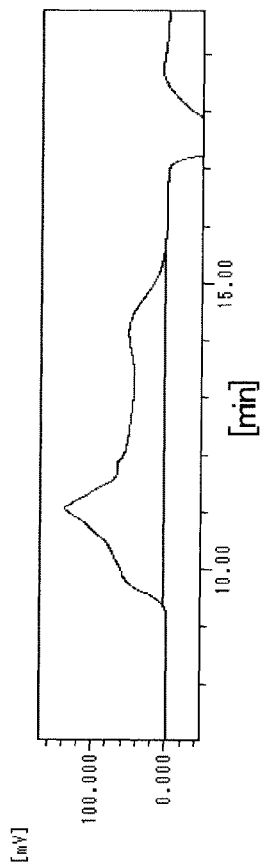
FIG. 22 is the GPC chart of the ABA triblock copolymer obtained in Example 9.

The GPC chart of the obtained ABA triblock copolymer [AaH(25)-PSSNa(200)-AaH(25)] is depicted in FIG. 22. The molecular weight distribution (Mw/Mn) thereof was 6.47.

<Evaluation>
<<Relationship Between pH of Solution and Shear Viscosity>>

Each of the ABA triblock copolymers obtained in Examples 1 to 9 was dissolved in pure water to give a concentration of 5% by mass, to thereby prepare an aqueous solution. The pH of the aqueous solution and the shear viscosity of the aqueous solution with the shear rate of $1\ s^{-1}$ were measured.

Moreover, an aqueous solution whose added $H^+$ concentration had been adjusted was prepared by diluting a 6% by mass aqueous solution of each of the ABA triblock copolymers obtained in Examples 1 to 9 to 1.2 times (mass ratio) with a hydrochloric aqueous solution having different normality. This aqueous solution was also subjected to the measurements of pH and the shear viscosity with the shear rate of $1\ s^{-1}$.

The added $H^+$ concentration is defined here as (a mole number of $H^+$ added)/(a volume of a 6% by mass polymer aqueous solution).

In the case where the added $H^+$ was 0 mmol/L, the shear viscosity was measured 30 minutes after dissolving the ABA triblock copolymer in pure water. For the aqueous solution whose added $H^+$ concentration had been adjusted, the shear viscosity was measured 30 minutes after adding hydrochloric acid.

The measuring conditions are as follows. The results are presented in Table 1.

Measuring device: Physica MCR-301, manufactured by Anton Paar GmbH
Geometry: CP50-1-SN21301 (diameter: 50 mm, 1° corn plate, d=0.096 mm)
Measuring mode: Control Rate
Shear rate: $1\ s^{-1}$ to $1{,}000\ s^{-1}$
Data point: 13 points (logarithm division)
Measuring interval: 10 s
Measuring temperature: 25° C.

TABLE 1

| | Average polymerization degree P(A) | Average polymerization degree P(B) | P(B)/P(A) | | Added $H^+$ concentration | | | | |
|---|---|---|---|---|---|---|---|---|---|
| | | | | | 0 mmol/L | 5 mmol/L | 10 mmol/L | 15 mmol/L | 20 mmol/L |
| Ex. 1 | 5 | 900 | 180 | shear viscosity (mPa·s) | 5.7 | 150 | 45,000 | 51,000 | 51,000 |
| | | | | pH | 7.5 | 6.2 | 3.5 | 2.4 | 2.2 |
| Ex. 2 | 5 | 400 | 80 | shear viscosity (mPa·s) | 3.3 | 5.1 | 57 | 3,500 | 5,000 |
| | | | | pH | 7.4 | 6.3 | 5.7 | 3.1 | 2.4 |
| Ex. 3 | 5 | 200 | 40 | shear viscosity (mPa·s) | 2.5 | 3.3 | 4.0 | 14 | 440 |
| | | | | pH | 7.4 | 6.5 | 6.2 | 6.0 | 5.3 |
| Ex. 4 | 5 | 2,300 | 460 | shear viscosity (mPa·s) | 8.5 | 28 | 31 | 31 | 31 |
| | | | | pH | 7.5 | 3.6 | 2.5 | 2.1 | 1.9 |
| Ex. 5 | 3 | 900 | 300 | shear viscosity (mPa·s) | 5.8 | 7.0 | 9.3 | 9.3 | 9.3 |
| | | | | pH | 7.1 | 4.0 | 2.6 | 2.2 | 2.0 |
| Ex. 6 | 5 | 200 | 40 | shear viscosity (mPa·a) | 6.0 | 6.2 | 7.5 | 9.8 | 13 |
| | | | | pH | 7.2 | 6.3 | 6.0 | 5.5 | 4.4 |
| Ex. 7 | 5 | 200 | 40 | shear viscosity (mPa·s) | 3.2 | 3.7 | 5.0 | 18 | 250 |
| | | | | pH | 7.4 | 6.4 | 6.1 | 5.8 | 4.9 |

In Examples 1 to 7, the viscosity depicted in Table 1 was immediately achieved, as H⁺ was added. Therefore, it could be confirmed that a response speed to the viscosity change was fast.

The aqueous solution whose added H⁺ concentration had been adjusted was neutralized to give pH of about 7.5, and the shear viscosity thereof was almost the same viscosity to that in the case of 0 mmol/L depicted in Table 1. Therefore, it could be confirmed that the viscosity change was reversible.

In Examples 1, 2 and 3 satisfying 20<P(B)/P(A)<300, and 3<P(A)<10, a significant viscosity change was observed. Especially in Example 1, the viscosity change of about 10,000 times was seen.

In Example 4 where P(B)/P(A) was 300 or greater, a viscosity change was smaller than those in Examples 1 to 3, but the viscosity change of about 3 times to about 4 times was confirmed. In Example 5 where P(A)=3, moreover, a viscosity change of about 1.5 times to about 2 times was confirmed.

In Example 7 where Mw/Mn exceeded 2.00 but was close to 2.00, a viscosity change of 80 times was confirmed. In Example 6 where Mw/Mn largely exceeded 2.00, and was 4.51, on the other hand, a viscosity change of about 2 times was confirmed.

As for the ABA triblock copolymer of Example 8, AaH(25)-DMA(200)-AaH(25), where P(B)/P(A) was 20 or less, the shear viscosity was 3.1 mPa·s (pH 8.9) when the added H⁺ concentration was 0 mmol/L, and was 3.2 mPa·s (pH 6.8) when the added H⁺ concentration was mmol/L, thus the shear viscosity hardly changed. However, when the added H⁺ concentration was 100 mmol/L, the shear viscosity thereof was 80 mPa·s (pH 2.0), and a viscosity change was confirmed.

It was considered that the reason why a viscosity change was small at the added H⁺ concentration of 20 mmol/L in Example 8 was that the A-block exhibiting pH response was too large, pH could not be sufficiently lowered at the unit polymer concentration (in this case, 5% by mass) with a certain acid added concentration (in this case, 20 mmol/L), and thus hydrophobic association hardly occurred. In addition, it was considered that the carbon number of R² in the general formula (1) was 5, and the hydrophobic association force was too small.

The ABA triblock copolymer [P(B)/P(A)=8] of Example 9, AaH(25)-PSSNa(200)-AaH(25), had the shear viscosity of 27 mPa·s (pH 8.9) when the added H⁺ concentration was 0 mmol/L, and had the shear viscosity of 25 mPa·s (pH 6.8) when the added H⁺ added concentration was mmol/L, and the shear viscosity hardly changed. However, when the added H⁺ concentration was 100 mmol/L, the shear viscosity thereof was 66 mPa·s (pH 1.9), and a viscosity change was confirmed.

<<Relationship Between Polymer Concentration and Viscosity>>

A concentration of the ABA triblock copolymer synthesized in Example 1 in an aqueous solution was varied, and viscosities and pH were measured. The results are presented in Table 2.

TABLE 2

| Concentration of polymer | Added H⁺ concentration | 0 mmol/L | 3 mmol/L | 6 mmol/L | 8 mmol/L | 20 mmol/L |
|---|---|---|---|---|---|---|
| 5% by mass | shear viscosity (mPa·s) | 5.7 | 9.2 | 510 | 27,000 | 51,000 |
|  | pH | 7.5 | 6.6 | 6.0 | 4.4 | 2.2 |
| 3% by mass | shear viscosity (mPa·s) | 3.3 | 7.3 | 5,700 | 5,800 | 6,200 |
|  | pH | 7.5 | 6.2 | 3.3 | 2.9 | 2.2 |
| 2% by mass | shear viscosity (mPa·s) | 2.2 | 34 | 540 | 600 | 550 |
|  | pH | 7.7 | 5.5 | 2.9 | 2.6 | 2.1 |

It was found from the results depicted in Tables 1 and 2 that use of the ABA triblock copolymer Example 1 gave extremely high viscosity with the added H⁺ concentration of about 10 mmol/L, when the polymer concentration was 5% by mass, a viscosity increase reached a saturated state. Similarly, when the polymer concentration was 3% by mass and 2% by mass, the added H⁺ concentrations thereof were respectively 6 mmol/L and 4 mmol/L (data omitted), and a viscosity increase reached a saturated state. This corresponds to a mole concentration of carboxylic acid of the polymer in the aqueous solution. The ABA triblock copolymer of the present invention, which has the monomer represented by the general formula (1) in a constitutional unit thereof exhibits a thickening effect due to protonation of a carboxyl ion to carboxylic acid. Therefore, it is considered that a viscosity increase reaches a saturated state as all carboxyl ions of the polymer are protonated to carboxylic acid in the aqueous solution.

A significant change in the viscosity was observed at pH of 4 to 6. This means that pKa of the carboxylic acid of the ABA triblock copolymer synthesized in Example 1 is about 5, and the aqueous solution increases its viscosity or is made gelation due to hydrophobic association between molecules of the polymer caused by protonation of carboxyl ions to carboxylic acid, i.e., a change from hydrophilicity to hydrophobicity.

<<Influence of Various Additives>>

The ABA triblock copolymer of Example 1 was used, and the polymer concentration was fixed to 2% by mass. A viscosity change when various additives were added was studied.

—Influence of Electrolyte—

To an aqueous solution containing the ABA triblock copolymer, potassium chloride was added as an electrolyte so that the potassium chloride concentration in the aqueous solution became 0.62% by mass, 1.26% by mass, and 2% by mass, respectively. The electric conductivities of these aqueous solution were respectively 1 S/m, 2 S/m, and 3 S/m. To each of these aqueous solution, a hydrochloric acid aqueous solution was added to give the added $H^+$ concentration of 6 mmol/L. All of these aqueous solutions had the shear viscosity in the range of 500 mPa·s to 600 mPa·s, and the viscosity hardly changed from the case where an electrolyte was not added. It was confirmed that there was hardly any influence of the electrolyte on the thickening.

—Influence of Moisturizing Agent—

To an aqueous solution containing the ABA triblock copolymer, glycerin was added so that the concentration of the glycerin in the aqueous solution became 15% by mass. Further, to the aqueous solution, a hydrochloric acid aqueous solution was added to give the added $H^+$ concentration of 6 mmol/L. The shear viscosity of the resulting aqueous solution was 450 mP·s, which was slightly lower compared to the case where no moisturizing agent was added, but it was confirmed that an influence of the moisturizing agent was small on the thickening.

Example 10

3-Step Synthesis

Synthesis of ABA Triblock Copolymer [AaU(10)-DMA(500)-AaU(8)]

As for a chain transfer agent, 2-methyl-2-[(dodecylsulfanylthiocarbonyl)sulfanyl]propanoic acid, a commercial product (manufactured by Sigma-Aldrich Japan) was used as it was.

—Synthesis of AaU (10)—

In 4 mL of methanol, 1.025 g (4 mmol) of AaU obtained in Synthesis Example 1, 0.146 g (0.4 mmol) of 2-methyl-2-[(dodecylsulfanylthiocarbonyl)sulfanyl]propanoic acid as a chain transfer agent, and 0.045 g (0.16 mmol) of 4,4'-azobis (4-cyanovaleric acid) serving as a polymerization initiator were dissolved to prepare a methanol solution, and the methanol solution was deaerated with argon for 30 minutes. The methanol solution after the deaeration heated to 70° C. to carry out polymerization for 5 hours. After the polymerization, hexane was added to separate the methanol solution. The separated methanol solution was collected, followed by vacuum dried to thereby obtain a polymer.

The obtained polymer was subjected to $^1$H-NMR spectroscopy using neuterated methanol as a solvent, and a reactivity was calculated by comparing the residual monomer and a methylene peak derived from AaU. The reactivity was 97%. Moreover, the average polymerization degree was calculated by comparing a methyl peak of the chain transfer agent and a methylene peak derived from AaU. As a result, it was found that the obtained polymer was a decamer of AaU [AaU (10)] having the average polymerization degree of about 10.

Figure 23:
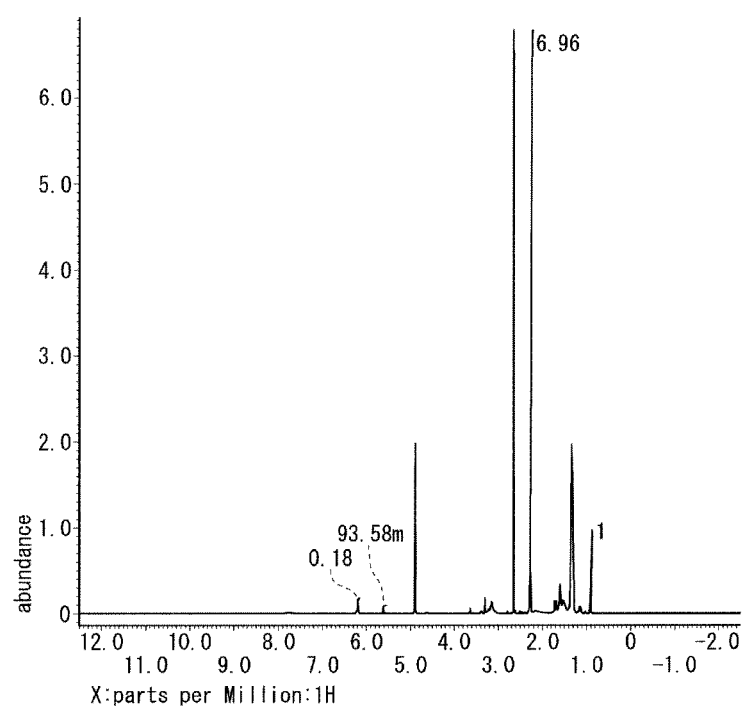
FIG. 23 is the $^1$H-NMR spectrum of the dimer of 11-acrylamide undecanoic acid obtained in Example 10.

The $^1$H-NMR spectrum of a solution obtained by dissolving the obtained polymer in neuterated methanol is depicted in FIG. 23.

—Synthesis of AaU(10)-DMA(500)—

In 79 mL of methanol, 15.7 g (158 mmol) of dimethylacryl amide (DMA), 0.9245 g (0.3168 mmol) of the obtained polymer AaU (10), and 0.0358 g (0.1277 mmol) of 4,4'-azobis(4-cyanovaleric acid) serving as a polymerization initiator to thereby prepare a methanol solution, and the methanol solution was deaerated with argon for 30 minutes. The methanol solution after the deaeration was heated to 70° C. to carry out polymerization for 4 hours.

After the polymerization, the methanol solution was subjected to $^1$H-NMR spectroscopy with a capillary tube charged with heavy water, and the reactivity of DMA was determined. The reactivity thereof was 96%. Moreover, the average polymerization degree of DMA was about 500, and it was found that the obtained methanol solution was an AaU(10)-DMA (500) (AB diblock copolymer) methanol solution.

Figure 24:
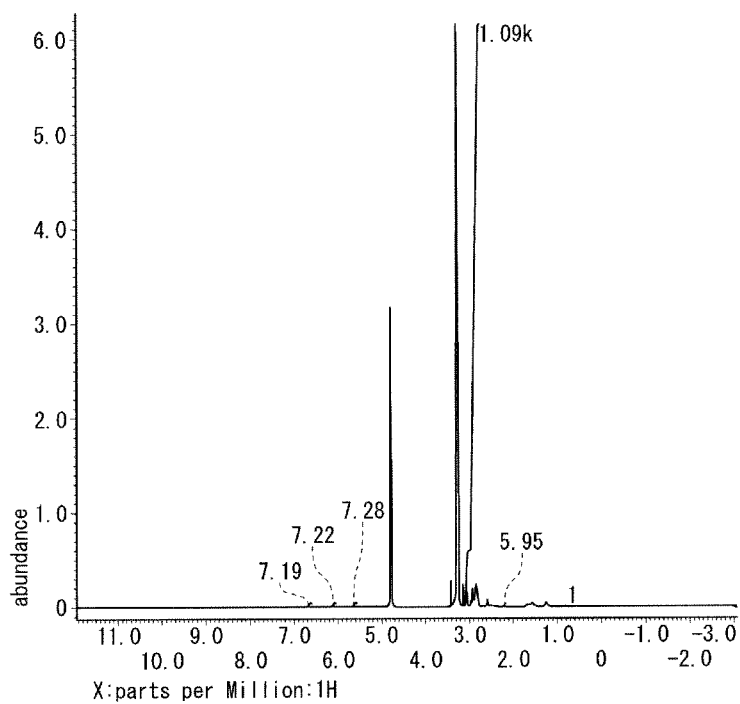
FIG. 24 is the $^1$H-NMR spectrum of the AB diblock copolymer (in a methanol solution) obtained in Example 10.

The $^1$H-NMR spectrum of the obtained polymer (in a methanol solution) was depicted in FIG. 24.

The methanol solution was subjected to dialysis with a dialysis membrane(dialysis membrane 36/32, product number: UC 36-32-100, manufactured by EIDIA Co., Ltd.) using water for 16 hours, to thereby obtain a cloudy liquid having high viscosity. A moisture was removed from the obtained liquid by freeze drying to thereby obtain AaU (10)-DMA (500) in the form of a powder.

Figure 25:
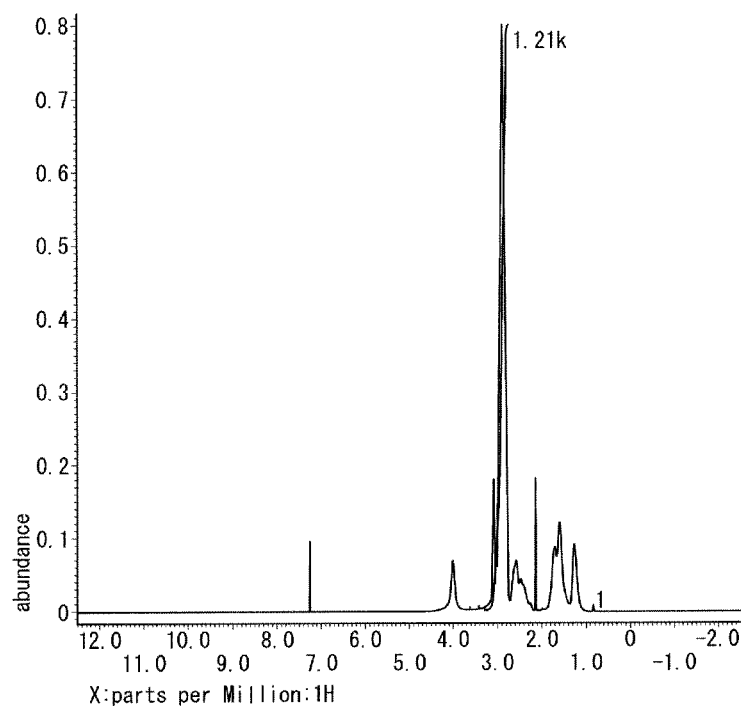
FIG. 25 is the $^1$H-NMR spectrum of the AB diblock copolymer (powder) obtained in Example 10.

The $^1$H-NMR spectrum of the obtained polymer (a solution obtained by dissolving the powder sample in deuterochloroform) is depicted in FIG. 25.

—Synthesis of AaU(10)-DMA(500)-AaU(8)—

In 2 mL of methanol, 0.129 g (0.51 mmol) of AaU obtained in Synthesis Example 1, 2.64 g (0.0503 mmol) of the obtained polymer AaU(10)-DMA(500), and 0.0050 g (0.0214 mmol) of 4,4'-azobis(4-cyanovaleric acid) serving as a polymerization initiator were dissolved to prepare a methanol solution. The methanol solution was deaerated with argon for 30 minutes. The methanol solution after the deaeration was heated to 70° C. to carry out polymerization for 5 hours.

After the polymerization, the resultant was diluted with 12.7 mL of methanol, and the resulting mixture was subjected to $^1$H-NMR spectroscopy with a capillary tube charged with heavy water, to determine the reactivity of AaU. The reactivity thereof was 80%. Moreover, the average polymerization degree of AaU was about 8, and it was found that the obtained methanol solution was an AaU(10)-DMA(500)-AaU(8) methanol solution.

Figure 26:
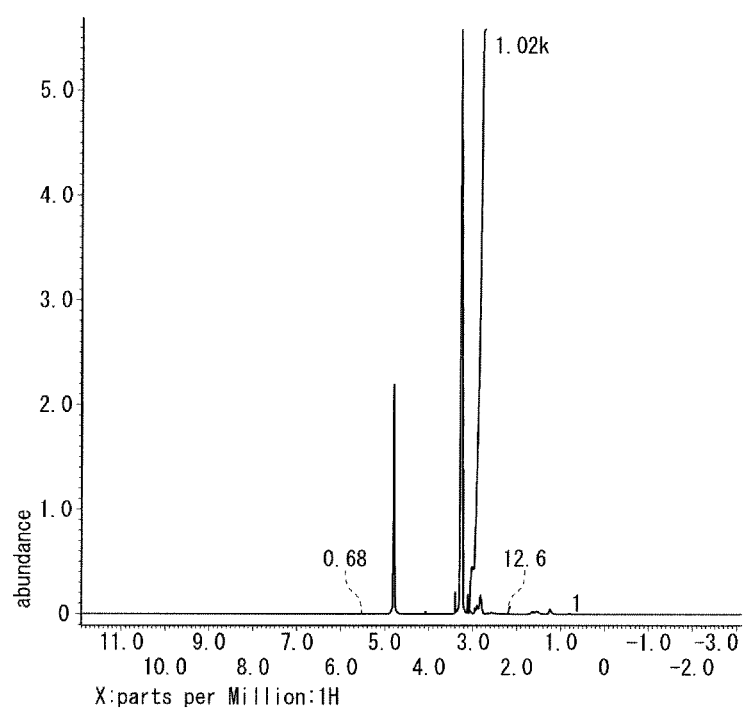
FIG. 26 is the $^1$H-NMR spectrum of the ABA triblock copolymer (in a methanol solution) obtained in Example 10.

The $^1$H-NMR spectrum of the obtained polymer (in a methanol solution) is depicted in FIG. 26.

The methanol solution was subjected to dialysis using water for 16 hours by a dialysis membrane (dialysis membrane 36/32, product number: UC 36-32-100, manufactured by EIDIA Co., Ltd.), to thereby obtain a polymer in the state of a gel. The pH of the resultant was then adjusted to 10 with a sodium hydroxide aqueous solution. The solution was subjected to further analysis, and moisture was removed from the resultant by freeze-drying, to thereby obtain AaU(10)-DMA (500)-AaU(8) in the form of a powder.

Figure 27:
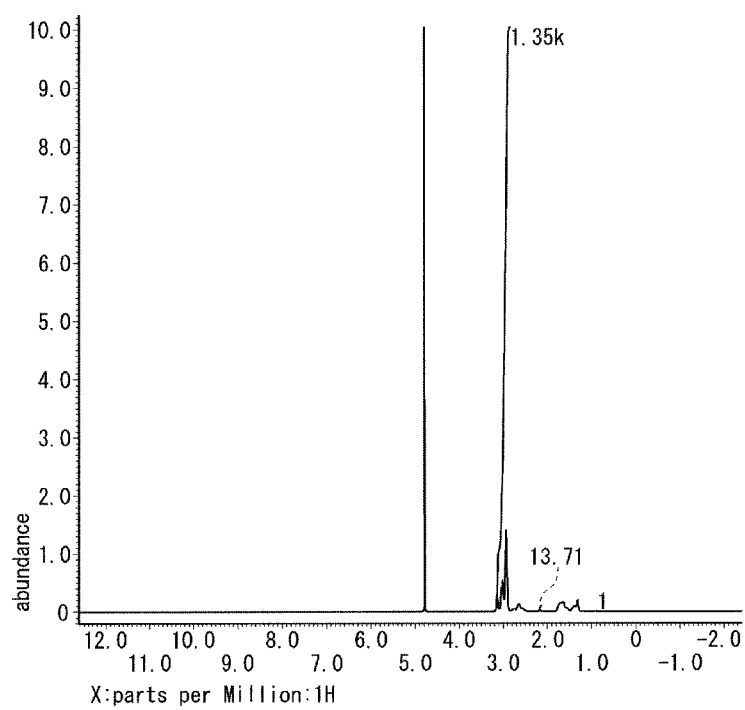
FIG. 27 is the $^1$H-NMR spectrum of the ABA triblock copolymer (powder) obtained in Example 10.

The $^1$H-NMR spectrum of the obtained polymer (a solution formed by dissolving the powder sample in deuterochloroform) is depicted in FIG. 27.

Figure 28:
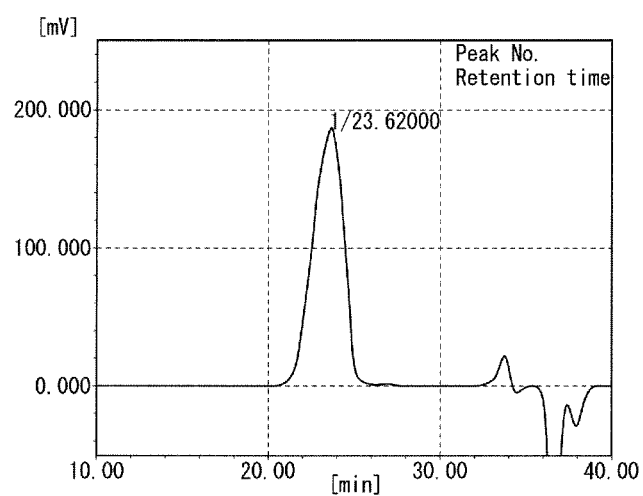
FIG. 28 is the GPC chart of the ABA triblock copolymer (powder) obtained in Example 10.

Moreover, gel permeation chromatography (GPC) was performed on the obtained copolymer, and it was found that the molecular weight distribution (Mw/Mn) thereof was 1.5. The result is depicted in FIG. 28.

Example 11

3-Step Synthesis

Synthesis of ABA Triblock Copolymer [AaU(10)-DMA(400)-AaU(8)]

—Synthesis of AaU(10)-DMA(400)—

In 69.1 mL methanol, 1.0086 g (0.3456 mmol) of AaU(10) obtained in Example 10, 13.7 g (138.2 mmol) of DMA, and 0.039 g (0.1391 mmol) of 2,2'-azobis(isobutyronitrile) serving as a polymerization initiator were dissolved to prepare a methanol solution, and the methanol solution was deaerated with argon for 30 minutes. After the deaeration, the methanol solution was heated to 70° C. to carry out polymerization for 4 hours.

After the polymerization, the methanol solution was subjected to $^1$H-NMR spectroscopy with a capillary tube charged with heavy water to determine the reactivity of DMA. The reactivity thereof was 97%. Moreover, the average polymerization degree of DMA was about 400, and it was found that the obtained methanol solution was an AaU(10)-DMA(400) methanol solution.

The methanol solution was subjected to dialysis with a dialysis membrane (dialysis membrane 36/32, product number: UC 36-32-100, manufactured by EIDIA Co., Ltd.) using water for 16 hours, to thereby obtain a cloudy liquid having high viscosity. A moisture was removed from the obtained liquid by freeze drying, to thereby obtain AaU(10)-DMA (400) in the form of a powder.

—Synthesis of AaU(10)-DMA(400)-AaU(8)—

In 2.6 mL methanol, 0.17 g (0.67 mmol) of AaU obtained in Synthesis Example 1, 2.64 g (0.0658 mmol) of the obtained polymer AaU(10)-DMA(400), and 0.0077 g (0.0275 mmol) of 4,4'-azobis(4-cyanovaleric acid) were dissolved to prepare a methanol solution, and the methanol solution was deaerated with argon for 30 minutes. The methanol solution after the deaeration was heated to 70° C. to carry out polymerization for 5 hours.

After the polymerization, the resultant was diluted with 12.7 mL of methanol, and the resulting mixture was subjected to $^1$H-NMR spectroscopy with a capillary tube charged with heavy water to determine the reactivity of AaU. The reactivity thereof was 80%. Moreover, the average polymerization degree of AaU was about 8, and it was found that the obtained methanol solution was an AaU(10)-DMA(400)-AaU(8) methanol solution.

The methanol solution was subjected to dialysis with a dialysis membrane (dialysis membrane 36/32, product number: UC 36-32-100, manufactured by EIDIA Co., Ltd.) using water for 16 hours, to thereby obtain a polymer in the form of a gel. The pH of the obtained polymer was adjusted to 10 with a sodium hydroxide aqueous solution, and the resultant was further subjected to dialysis. A moisture was then removed therefrom by freeze drying to thereby obtain AaU(10)-DMA (400)-AaU(8) in the form of a powder.

Moreover, gel permeation chromatography (GPC) was performed on the obtained copolymer, and it was found that the molecular weight distribution (Mw/Mn) thereof was 1.5.

Example 12

3-Step Synthesis

Synthesis of ABA Triblock Copolymer [AaU(10)-DMA(150)-AaU(8)]

AaU(10)-DMA(150)-AaU(8), in which the average polymerization degree of DMA was about 150, was produced in the same manner as in Example 10, provided that an amount of the DMA added was adjusted.

Example 13

3-Step Synthesis

Synthesis of ABA Triblock Copolymer [AaU(10)-DMA(3000)-AaU(8)]

AaU(10)-DMA(3000)-AaU(8), in which the average polymerization degree of DMA was about 3,000, was produced in the same manner as in Example 10, provided that an amount of the DMA added was adjusted.

Evaluation

Examples 10 to 13

The relationship between pH of a solution and shear viscosity was evaluated in the same manner as in Example 1.

When the added $H^+$ concentration was 0 mmol/L, the ABA triblock copolymer of Example 10, AaU(10)-DMA(500)-AaU(8)[P(B)/P(A)=56] had the shear viscosity of 4.3 mPa·s (pH 8.5). When the added $H^+$ concentration was 20 mmol/L, the shear viscosity thereof was 80,800 mPa·s (pH 3.9).

When the added $H^+$ concentration was 0 mmol/L, the ABA triblock copolymer of Example 11, AaU(10)-DMA(400)-AaU(8) [P(B)/P(A)=44], had the shear viscosity of 4.0 mPa·s (pH 8.4). When the added $H^+$ concentration was 20 mmol/L, the shear viscosity thereof was 264,000 mPa·s (pH 6.1).

When the added $H^+$ concentration was 0 mmol/L, the ABA triblock copolymer of Example 12, AaU(10)-DMA(150)-AaU(8) [P(B)/P(A)=17], had the shear viscosity of 2.6 mPa·s (pH 8.4). When the added $H^+$ concentration was 20 mmol/L, the shear viscosity thereof was 4.0 mPa·s (pH 6.6), and the viscosity change was small. When the added $H^+$ concentration was 100 mmol/L, however, the shear viscosity thereof was 48,000 mPa·s (pH 2.8), and the viscosity change could be confirmed.

It was considered that the reason why the viscosity change was small at the added $H^+$ concentration of 20 mmol/L in Example 12 was that P(B)/P(A) was 20 or lower, namely, the A-block exhibiting the pH response was too large, the pH was hardly lowered at the unit polymer concentration (in this case, 5% by mass) with a certain acid added concentration (in this case, 20 mmol/L), and hydrophobic association hardly occurred.

When the added $H^+$ concentration was 0 mmol/L, the ABA triblock copolymer of Example 13 [P(B)/P(A)=333], AaU (10)-DMA(3000)-AaU(8), had the shear viscosity of 11.4 mPa·s (pH 8.5). When the added $H^+$ concentration was 20 mmol/L, the shear viscosity thereof was 150 mPa·s (pH 2.1).

When the added $H^+$ concentration was 20 mmol/L, the ABA triblock copolymer of Example 13, AaU(10)-DMA (3000)-AaU(8), exhibited a viscosity change of about 13 times, but the viscosity change thereof was smaller than those of Examples 10 and 11. It was considered that this was because P(B)/P(A) was 300 or greater, namely the A-block exhibiting the pH response was too small, and therefore the pH was sufficiently lowered at a certain added acid concentration (in this case, 20 mmol/L), but there were only few crosslink points inducing hydrophobic association at the unit polymer concentration (in this case, 5% by mass).

The embodiments of the present invention are as follows:
<1> An ABA triblock copolymer containing:
an A-block having, in a constitutional unit thereof, a monomer represented by the following general formula (1) or a monomer represented by the following general formula (2); and
a B-block having, in a constitutional unit thereof, a hydrophilic monomer having a radical polymerizable unsaturated bond,

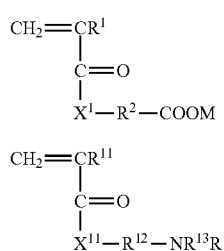

General Formula (1)

General Formula (2)

where $R^1$ is a hydrogen atom or a methyl group; $R^2$ is a C5-C18 alkylene group; M is a hydrogen atom or a monovalent metal atom; and $X^1$ is —NH— or an oxygen atom in the general formula (1), and
where $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom in the general formula (2).
<2> The ABA triblock copolymer according to <1>, wherein the ABA triblock copolymer has a molecular weight distribution of 2.00 or less.
<3> The ABA triblock copolymer according to any of <1> or <2>, wherein the hydrophilic monomer is a monomer represented by the general formula (3):

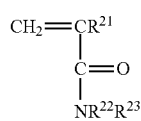

General Formula (3)

where $R^{21}$ is a hydrogen atom or a methyl group; and $R^{22}$ and $R^{23}$ are each independently a hydrogen atom, a methyl group, or an ethyl group in the general formula (3).
<4> The ABA triblock copolymer according to any one of <1> to <3>, wherein an average polymerization degree of the A-block [P(A)] and an average polymerization degree of the B-block [P(B)] satisfy the following formulae (I) and (II):

$3<P(A)<10$  Formula (I)

$20<P(B)/P(A)<300$  Formula (II)

<5> The ABA triblock copolymer according to any one of <1> to <4>, wherein the ABA triblock copolymer is obtained through reversible addition-fragmentation chain transfer polymerization using a chain transfer agent having one leaving group.

<6> The ABA triblock copolymer according to any one of <1> to <4>, wherein the ABA triblock copolymer is obtained through reversible addition-fragmentation chain transfer polymerization using a chain transfer agent having two leaving groups.
<7> A thickener containing:
the ABA triblock copolymer according to any one of <1> to <6>.
<8> An aqueous composition containing:
the ABA triblock copolymer according to any one of <1> to <6> or the thickener according to <7>; and
water.
<9> The aqueous composition according to <8>, further containing an electrolyte.

This application claims priority to Japanese application No. 2012-100942, filed on Apr. 26, 2012, and Japanese application No. 2013-024416, filed on Feb. 12, 2013, and incorporated herein by reference.

What is claimed is:
1. An ABA triblock copolymer comprising:
an A-block having, in a constitutional unit thereof, a monomer represented by the following general formula (1) or a monomer represented by the following general formula (2); and
a B-block having, in a constitutional unit thereof, a hydrophilic monomer having a radical polymerizable unsaturated bond,

General Formula (1)

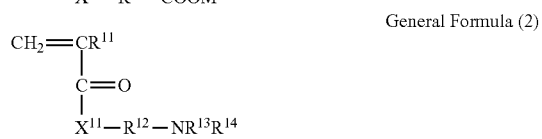

General Formula (2)

where $R^1$ is a hydrogen atom or a methyl group; $R^2$ is a C5-C18 alkylene group; M is a hydrogen atom or a monovalent metal atom; and $X^1$ is —NH— or an oxygen atom in the general formula (1), and
where $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom in the general formula (2),
wherein the hydrophilic monomer is a monomer represented by the general formula (3):

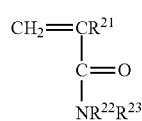

General Formula (3)

where $R^{21}$ is a hydrogen atom or a methyl group; and $R^{22}$ and $R^{23}$ are each independently a hydrogen atom, a methyl group, or an ethyl group in the general formula (3), and wherein an average polymerization degree of the A-block [P(A)] and an average polymerization degree of the B-block [P(B)] satisfy the following formulae (I) and (II):

$$3 < P(A) < 10 \quad \text{Formula (I)}$$

$$20 < P(B)/P(A) < 300 \quad \text{Formula (II).}$$

2. The ABA triblock copolymer according to claim 1, wherein the ABA triblock copolymer has a molecular weight distribution of 2.00 or less.

3. The ABA triblock copolymer according to claim 1, wherein the ABA triblock copolymer is obtained through reversible addition-fragmentation chain transfer polymerization using a chain transfer agent having one leaving group.

4. The ABA triblock copolymer according to claim 1, wherein the ABA triblock copolymer is obtained through reversible addition-fragmentation chain transfer polymerization using a chain transfer agent having two leaving groups.

5. A thickener comprising:
an ABA triblock copolymer,
wherein the ABA triblock copolymer comprises:
an A-block having, in a constitutional unit thereof, a monomer represented by the following general formula (1) or a monomer represented by the following general formula (2); and
a B-block having, in a constitutional unit thereof, a hydrophilic monomer having a radical polymerizable unsaturated bond,

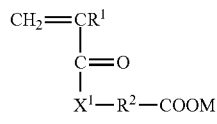

General Formula (1)

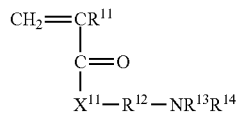

General Formula (2)

where $R^1$ is a hydrogen atom or a methyl group; $R^2$ is a C5-C18 alkylene group; M is a hydrogen atom or a monovalent metal atom; and $X^1$ is —NH— or an oxygen atom in the general formula (1), and
where $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom in the general formula (2),
wherein the hydrophilic monomer is a monomer represented by the general formula (3):

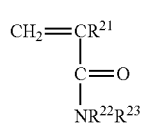

General Formula (3)

where $R^{21}$ is a hydrogen atom or a methyl group; and $R^{22}$ and $R^{23}$ are each independently a hydrogen atom, a methyl group, or an ethyl group in the general formula (3), and wherein an average polymerization degree of the A-block [P(A)] and an average polymerization degree of the B-block [P(B)] satisfy the following formulae (I) and (II):

$$3 < P(A) < 10 \quad \text{Formula (I)}$$

$$20 < P(B)/P(A) < 300 \quad \text{Formula (II).}$$

6. The thickener according to claim 5, wherein the ABA triblock copolymer has a molecular weight distribution of 2.00 or less.

7. The thickener according to claim 5, wherein the ABA triblock copolymer is obtained through reversible addition-fragmentation chain transfer polymerization using a chain transfer agent having one leaving group.

8. The thickener according to claim 5, wherein the ABA triblock copolymer is obtained through reversible addition-fragmentation chain transfer polymerization using a chain transfer agent having two leaving groups.

9. An aqueous composition comprising:
an ABA triblock copolymer or a thickener; and
water,
wherein the ABA triblock copolymer comprises:
an A-block having, in a constitutional unit thereof, a monomer represented by the following general formula (1) or a monomer represented by the following general formula (2); and
a B-block having, in a constitutional unit thereof, a hydrophilic monomer having a radical polymerizable unsaturated bond,

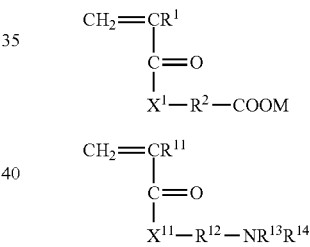

General Formula (1)

General Formula (2)

where $R^1$ is a hydrogen atom or a methyl group; $R^2$ is a C5-C18 alkylene group; M is a hydrogen atom or a monovalent metal atom; and $X^1$ is —NH— or an oxygen atom in the general formula (1), and
where $R^{11}$ is a hydrogen atom or a methyl group; $R^{12}$ is a C5-C18 alkylene group; $R^{13}$ and $R^{14}$ are each independently a hydrogen atom, a methyl group, or an ethyl group; and $X^{11}$ is —NH— or an oxygen atom in the general formula (2),
wherein the hydrophilic monomer is a monomer represented by the general formula (3):

General Formula (3)

where $R^{21}$ is a hydrogen atom or a methyl group; and $R^{22}$ and $R^{23}$ are each independently a hydrogen atom a methyl group, or an ethyl group in the general formula (3), wherein an average polymerization degree of the A-block [P(A)] and an average polymerization degree of the B-block [P(B)] satisfy the following formulae (I) and (II):

$$3 < P(A) < 10 \quad \text{Formula (I)}$$

$$20 < P(B)/P(A) < 300 \quad \text{Formula (II), and}$$

wherein the thickener comprises the ABA triblock copolymer.

10. The aqueous composition according to claim 9, further comprising an electrolyte.

11. The aqueous composition according to claim 9, wherein the ABA triblock copolymer has a molecular weight distribution of 2.00 or less.

12. The aqueous composition according to claim 9, wherein the ABA triblock copolymer is obtained through reversible addition-fragmentation chain transfer polymerization using a chain transfer agent having one leaving group.

13. The aqueous composition according to claim 9, wherein the ABA triblock copolymer is obtained through reversible addition-fragmentation chain transfer polymerization using a chain transfer agent having two leaving groups.

* * * * *